(12) United States Patent
Saitoh

(10) Patent No.: US 8,515,638 B2
(45) Date of Patent: Aug. 20, 2013

(54) TRANSMISSION

(75) Inventor: Tetsushi Saitoh, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 457 days.

(21) Appl. No.: 12/951,103

(22) Filed: Nov. 22, 2010

(65) Prior Publication Data

US 2011/0125377 A1 May 26, 2011

(30) Foreign Application Priority Data

Nov. 24, 2009 (JP) ................................. 2009-266840

(51) Int. Cl.
*F16D 43/00* (2006.01)
*F16D 48/06* (2006.01)

(52) U.S. Cl.
USPC ................... 701/67; 701/36; 701/21; 701/52; 192/31; 192/32; 192/48.2

(58) Field of Classification Search
None
See application file for complete search history.

(56) References Cited

U.S. PATENT DOCUMENTS

| | | | |
|---|---|---|---|
| 5,109,968 A * | 5/1992 | Pollitt et al. | 192/83 |
| 6,348,023 B1 | 2/2002 | Martelli | |
| 8,342,051 B2 * | 1/2013 | Pritchard et al. | 74/331 |
| 2007/0240957 A1 * | 10/2007 | Kosugi et al. | 192/20 |
| 2008/0021621 A1 * | 1/2008 | Kosugi | 701/52 |
| 2008/0060900 A1 * | 3/2008 | Pick | 192/83 |
| 2008/0087119 A1 * | 4/2008 | Shiozaki | 74/330 |
| 2008/0296082 A1 * | 12/2008 | Ogasawara et al. | 180/383 |
| 2009/0078069 A1 * | 3/2009 | Nedachi et al. | 74/330 |
| 2009/0084651 A1 * | 4/2009 | Fujimoto et al. | 192/87.14 |
| 2009/0139826 A1 * | 6/2009 | Ogasawara et al. | 192/85 R |
| 2009/0222182 A1 * | 9/2009 | Tomoda et al. | 701/67 |
| 2009/0287387 A1 * | 11/2009 | Tomoda | 701/68 |
| 2010/0025180 A1 * | 2/2010 | Kanno et al. | 192/87.11 |
| 2011/0190996 A1 * | 8/2011 | Nedachi et al. | 701/67 |
| 2012/0239264 A1 * | 9/2012 | Kojima et al. | 701/53 |
| 2013/0081491 A1 * | 4/2013 | Arai | 74/331 |

FOREIGN PATENT DOCUMENTS

| | | |
|---|---|---|
| EP | 1 826 440 A1 | 8/2007 |
| EP | 1 936 224 A2 | 6/2008 |
| EP | 1 985 879 A1 | 10/2008 |
| JP | 4150481 B2 | 9/2008 |

OTHER PUBLICATIONS

Official Communication issued in corresponding European Patent Application No. 10192378.7, mailed on Mar. 1, 2013.

* cited by examiner

*Primary Examiner* — Jonathan M Dager
(74) *Attorney, Agent, or Firm* — Keating & Bennett, LLP

(57) ABSTRACT

A dual clutch automated manual transmission includes a first clutch and a second clutch, and a clutch torque capacity command value for a plurality of clutch actuators arranged to drive the first clutch and second clutch based on operation of a by-wire type of clutch lever, wherein the clutch torque capacity of the plurality of clutches is controlled. An operator can adjust a driving force by manually operating the clutch in the transmission in which a clutch operation is controlled automatically, such as an automatic transmission system, automated manual transmission system, or dual clutch automated manual transmission system, thereby improving drivability.

16 Claims, 10 Drawing Sheets

FIG. 12

| | | MT | SEMI-MT | AMT | AT |
|---|---|---|---|---|---|
| OPERATION/CONTROL | MODE IMAGE | | | | |
| OPERATION/CONTROL | CLUTCH OPERATION — SETTING OFF | ● | | | |
| OPERATION/CONTROL | CLUTCH OPERATION — CHANGING GEAR | ● | AUTOMATIC | AUTOMATIC | AUTOMATIC |
| OPERATION/CONTROL | CLUTCH OPERATION — STOPPING | ● | ● | AUTOMATIC | AUTOMATIC |
| OPERATION/CONTROL | CLUTCH OPERATION — EMERGENCY | ● | ● | ● | ● |
| OPERATION/CONTROL | SHIFT OPERATION — N→1 | ● | ● | ● | ● |
| OPERATION/CONTROL | SHIFT OPERATION — CHANGING GEAR | ● | ● | ● | AUTOMATIC |
| OPERATION/CONTROL | SHIFT OPERATION — 1→N | ● | ● | ●/TIME | ●/TIME |
| OPERATION/CONTROL | SHIFT OPERATION — ?→1 | ● | ● | ● | ● |
| OPERATION/CONTROL | SETTING-OFF CONDITIONS — CLUTCH | ● | ● | ● | |
| OPERATION/CONTROL | SETTING-OFF CONDITIONS — SHIFT | ● | ● | ● | ● |
| OPERATION/CONTROL | SETTING-OFF CONDITIONS — ACCELERATOR | ● | ● | ● | ● |
| SAFETY | NUMBER OF OPERATIONS | 3 | 3 | 2 | 2 |
| SAFETY | IMMUNITY TO ERRONEOUS SETTING OFF | ◎ | ◎ | ○ | ○ |
| SAFETY | FREEDOM OF ACCELERATION WHEN SETTING OFF | ○ | ○ | △ | △ |
| IDEAS/REQUESTS | CLUTCH DECELERATION WHILE RUNNING | ○ | ○ | ○ | ○ |

TRANSMISSION

CROSS REFERENCE TO RELATED APPLICATIONS

This application claims the benefit of Japanese Patent Application No. 2009-266840, filed on Nov. 24, 2009, the disclosure of which including the specification, drawings and abstract is incorporated herein by reference in its entirety.

BACKGROUND OF THE INVENTION

1. Field of the Invention

The present invention relates to a transmission mounted in a vehicle.

2. Description of the Related Art

Heretofore, various kinds of transmission systems have been used in vehicle drive systems, one of which is a manual transmission (hereinafter referred to as "MT") system whereby a driver changes a transmission gear using a clutch lever and change pedal (shift pedal).

There are also cases in which an automatic transmission ("AT") system is used whereby a shift actuator is driven automatically, and a transmission gear change is performed according to the vehicle speed, engine rotation speed, or the like. With this AT system, a torque converter type AT that combines a torque converter and a planetary gear and performs gear changing automatically by hydraulic control is used in most vehicles. With a torque converter type AT, gear change timing is set precisely by computer control based on various factors such as adjustment of accelerator depression, vehicle speed, and so forth.

AT systems also include an automated manual transmission (hereinafter referred to as "AMT") system in which only clutch operation is automated, and a manual-selection multi-speed transmission is combined in which a clutch and gearbox have the same kind of structure as in an MT system.

An AMT system is also called a semi-automatic transmission system, as only clutch operation is automatic, and a driver performs gear selection by normal MT system operation. That is, the shift actuator is driven and a transmission gear is changed by command of a driver.

Presently, an AMT mounted in a passenger car also performs gear selection automatically by controlling throttle opening and clutch and gearbox actuators by-wire control (electronic control). Furthermore, a dual clutch automated manual transmission (DCT), which is an automatic transmission that has a clutch having two power transmission paths, is also known as a transmission mounted in an automobile.

There is also a type of vehicle in which different transmission systems can be selected, as described in Japanese Patent Application Laid-Open No. 4150481, for example. According to Japanese Patent Application Laid-Open No. 4150481, a transmission system can be selected from a semi-automatic transmission system and a fully automatic transmission system.

With an AT system, an AMT system, and a DCT system, driving is simpler than with an MT system as the clutch operation is generally automated and the clutch operation by a driver is eliminated.

In recent years, the following demands have arisen concerning gear changing in an AT or an AMT type of transmission, (1) a driving force to be restored by engaging the clutch gently, (2) a driving force to be adjusted without changing gears in a traffic jam or the like, and (3) a fast start.

That is, there is a demand for a driver to be able to perform clutch engagement/disengagement or half-clutch adjustment operation in order to (1) adjust the degree of restoration of driving force when changing gears, (2) adjust driving force without a gear change, and (3) adjust driving force when setting off, for instance.

With a motorcycle, in particular, it is preferable to adjust the driving force output via the transmission when cornering. Specifically, when making a tight turn, the vehicle can be banked by disengaging the clutch, and there is a demand to be able to make an appropriate turn using this operation. Also, there is a demand to be able to perform clutch operation in order to lower the front wheel by adjusting the driving force when performing a wheelie when setting off.

SUMMARY OF THE INVENTION

Preferred embodiments of the present invention provide a transmission that enables a driver to adjust a driving force by manually operating a clutch in a transmission in which a clutch operation is controlled automatically, such as with an AT system, an AMT system, or a DCT system, and enables improved drivability to be achieved.

A preferred embodiment of the present invention employs a configuration including a clutch actuator arranged to engage or disengage a clutch of a multi-speed transmission, a shift actuator arranged to perform a shift change of the multi-speed transmission, a control unit arranged and programmed to control the clutch actuator and the shift actuator, a clutch lever, and an amount of lever operation detection section arranged to convert an amount of a clutch lever operation to an electrical signal and output this signal to the control unit, wherein the control unit includes at least one of an AMT mode in which a series of shift change operations are performed by controlling the clutch actuator and the shift actuator in a coordinated manner when a shift change command is input by a shift operation by an operator, and an AT mode in which a shift selection and a series of change operations are performed automatically without regard to the shift operation by the operator, and, in the at least one of the AMT mode and the AT mode, the control unit is arranged and programmed to manipulate a clutch torque capacity by deciding an operation command value that controls the clutch torque capacity of the clutch based on an amount of the clutch lever operation, and output this operation command value to the clutch actuator.

According to a preferred embodiment of the present invention, a driver can adjust the driving force by manually operating a clutch in a transmission in which the clutch operation is controlled automatically, such as an AT system, an AMT system, or a DCT system, and improved drivability can be achieved.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 12 is a drawing showing each driving mode of a transmission according to the present preferred embodiment.

DETAILED DESCRIPTION OF THE PREFERRED EMBODIMENTS

With reference now to the accompanying drawings, preferred embodiments of the present invention will be explained in detail below.

A vehicle in which a transmission of the present preferred embodiment is mounted may be of any kind, including an automobile or a saddle-mounted vehicle, but here, a motorcycle is described as such a vehicle. Also, the terms front, rear, left, and right in the preferred embodiments mean front, rear, left, and right from the viewpoint of the rider seated on the seat of the motorcycle.

A transmission according to the present preferred embodiment is preferably equipped with a plurality of friction drive clutches that implement seamless gear changing by performing power transfer alternately between odd-numbered gears and even-numbered gears, and is mounted on a motorcycle as a drive unit together with a single engine. First, an outline description will be given of a motorcycle on which a drive unit including a transmission is mounted.

Figure 1:
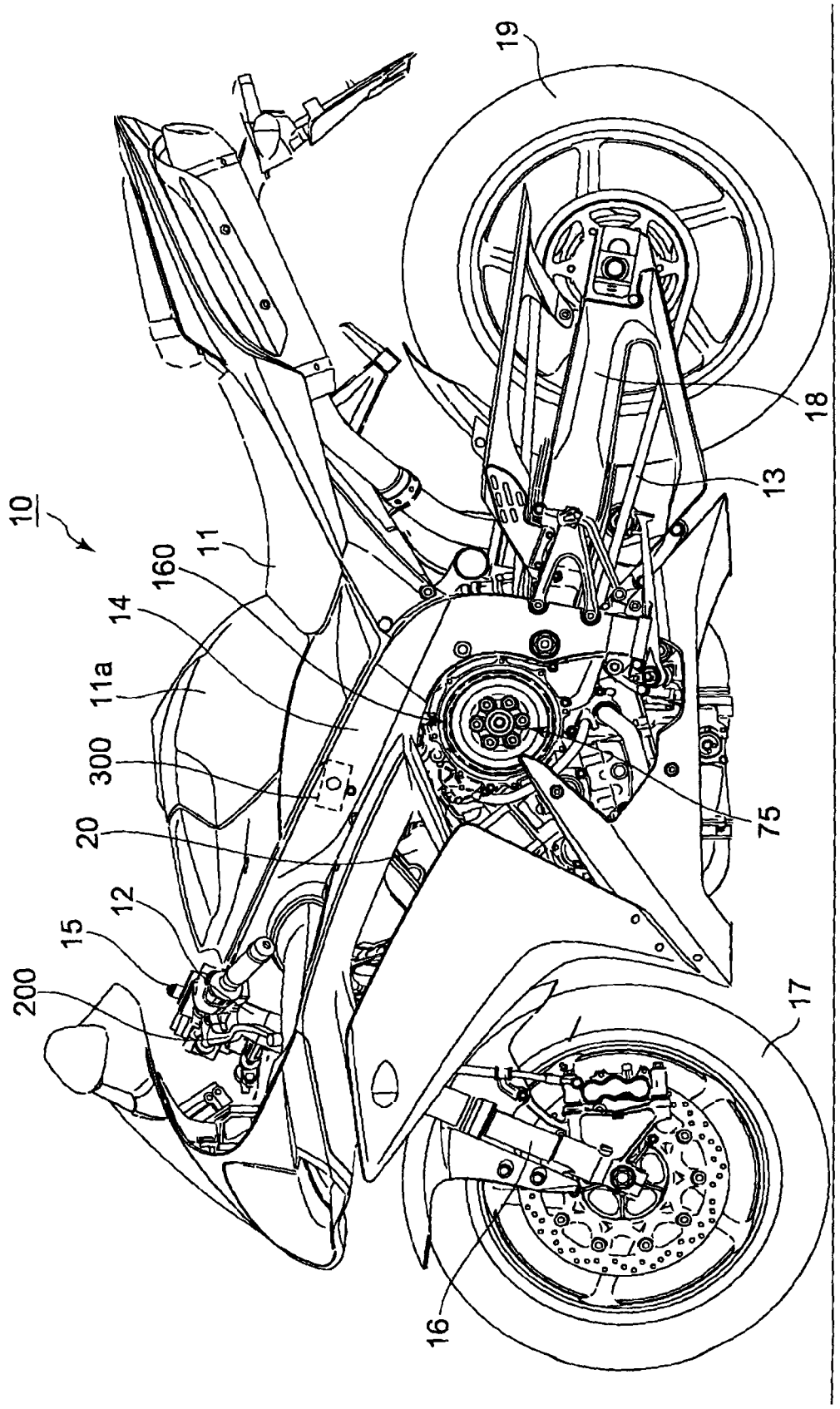
FIG. 1 is a side view of a motorcycle equipped with a transmission according to one preferred embodiment of the present invention.

FIG. 1 is a side view of a motorcycle equipped with a transmission according to one preferred embodiment of the present invention. On the motorcycle shown in FIG. 1, a clutch cover arranged to cover a clutch of the transmission has been removed, and the removal of the clutch cover exposes second clutch 75 of transmission mechanism 70 (see FIG. 2).

As shown in FIG. 1, motorcycle 10 is equipped with main frame 14 including head pipe 12 at the front end and arranged to extend rearward while sloping downward, and in which a drive unit including engine 20, transmission mechanism 70, a motor, and so forth, is placed internally. Front fork 16, to which handle 15 is attached at the top, is provided on head pipe 12 in a turnable manner, and supports front wheel 17 attached rotatably at the lower end of front fork 16.

Attached to handle 15 is by-wire type clutch lever 200 arranged to control a clutch by outputting an electrical signal converted from an amount of operation of by-wire type clutch lever 200 to the control unit.

As shown in FIG. 1, the engine 20 placed inside main frame 14, is provided in approximately the center portion of the vehicle, with crankshaft 60 (shown in FIG. 2) extending approximately horizontally below the cylinder head in a direction (a lateral direction) perpendicular to the front-back direction of the vehicle. At the rear of engine 20, transmission 160 is connected to crankshaft 60 (shown in FIG. 2) and transmits power input via crankshaft 60.

Rear arm 18 is joined and extends rearward and downward from the rear end side of main frame 14. Rear arm 18 supports rear wheel 19 and a driven sprocket (not shown) in a rotatable manner. Driving force is transferred to rear wheel 19 via drive chain 13 running between rear wheel 19 and drive sprocket 76 (see FIG. 2). In motorcycle 10, seat 11 and fuel tank 11a are placed above the drive unit, and control unit 300 arranged to control the operation of each section of motorcycle 10 is placed between seat 11 and fuel tank 11a and the drive unit. With twin-clutch transmission 100, operations for transferring power for odd-numbered and even-numbered transmission gears (transmission gear mechanism) from a single engine are controlled via control unit 300.

Figure 2:
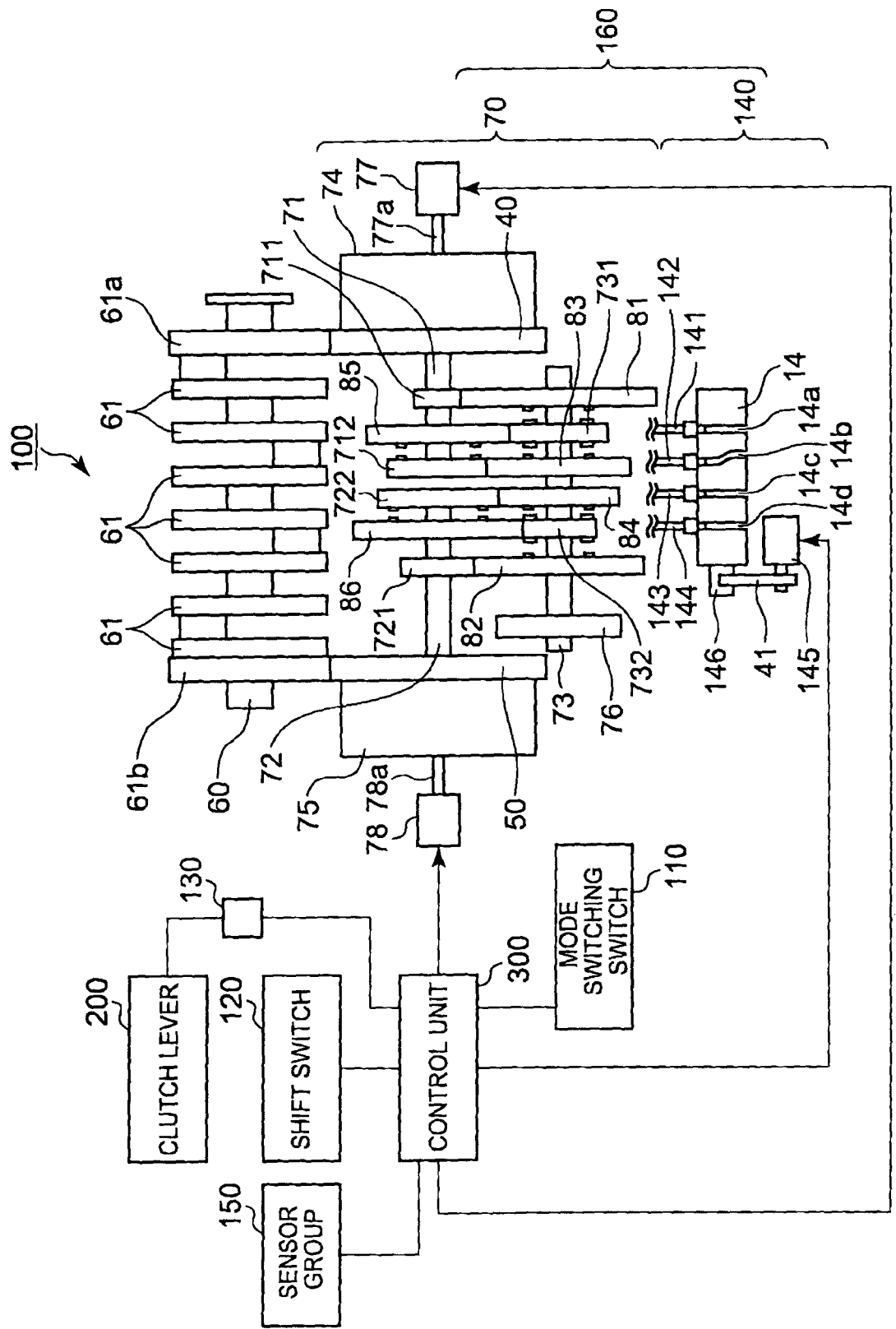
FIG. 2 is a schematic diagram showing a principal configuration of a transmission according to one preferred embodiment of the present invention.

FIG. 2 is a schematic diagram showing a principal configuration of a transmission according to one preferred embodiment of the present invention. The engine unit is omitted from FIG. 2.

A transmission of the present preferred embodiment is a DCT (Dual Clutch Automated Manual Transmission) transmission 160, in which transfer of the driving force to an odd-numbered or even-numbered transmission gear is possible by switching between a plurality of clutches (first clutch 74 and second clutch 75). With a transmission of the present preferred embodiment, clutch operation by an operator (i.e., driver) is possible using a clutch lever in the DCT. Either an AMT or DCT transmission may be used, thereby enabling transmission 160 clutch (first clutch 74 and second clutch 75) capacity to be adjusted by-wire clutch lever 200.

First, a description will be given of transmission 160 operating as a DCT equipped with clutches 74 and 75, whose capacity is adjusted by clutch lever 200.

As shown in FIG. 2, transmission 160 includes transmission mechanism 70 and shift mechanism 140.

Transmission mechanism 70 is connected to engine crankshaft 60, varies torque transferred from engine crankshaft 60, and transfers it to the rear wheel 19 (see FIG. 1). Furthermore, shift mechanism 140 performs torque-varying operations in transmission 160. In a motorcycle, crankshaft 60 is preferably placed in a direction orthogonal to the front-back direction of the vehicle, and approximately horizontally (in a lateral direction).

Crankshaft 60 includes a plurality of crank webs 61, and of these plurality of crank webs 61, crank webs 61a and 61b placed at one end and the other end of crankshaft 60 are external gears on which gear grooves are formed on the outer periphery.

Crank web 61a meshes with first primary driven gear (also referred to as "first input gear") 40 in first clutch 74. Through this meshing, power transferred to first input gear 40 from crank web 61a at one end of crankshaft 60 is transferred to first main shaft 71 of transmission 160 from one end of crankshaft 60 via first clutch 74.

Also, crank web 61b meshes with second primary driven gear (also referred to as "second input gear") 50 in second clutch 75.

Through this meshing, power transferred to second input gear 50 from crank web 61b at the other end of crankshaft 60 is transferred to second main shaft 72 from the other end of crankshaft 60.

First main shaft 71, second main shaft 72, and drive shaft (output shaft) 73 are preferably arranged parallel or substantially parallel to crankshaft 60.

First main shaft 71 and second main shaft 72 are placed side-by-side on the same axis line. First main shaft 71 is coupled to first clutch 74, and second main shaft 72 is coupled to second clutch 75.

First clutch 74 and second clutch 75 are arranged separate from each other in a direction orthogonal to the front-back direction of the vehicle (here, in a lateral direction) so as to sandwich first main shaft 71 and second main shaft 72 from either side of the vehicle.

First clutch 74 is a multi-plate friction clutch arranged to transfer rotational power from the engine to first main shaft 71 via crankshaft 60 in an engaged state, and blocks rotational power from the engine to first main shaft 71 in a disengaged state.

First clutch 74 operates in an engaged state and a disengaged state by driving first clutch actuator 77. That is, the transfer torque capacity (hereinafter referred to as "torque capacity") of first clutch 74 is changed by driving first clutch actuator 77.

Here, first clutch 74 is coupled to first pullrod 77a of first clutch actuator 77, and is placed in an engaged state or disengaged state through forward/backward movement of first pullrod 77a. With first clutch 74, when first pullrod 77a is pulled in a direction to separate from first clutch 74, a plurality of clutch plates and a plurality of friction plates (not shown) are separated from each other. By this operation, first clutch 74 is placed in a disengaged state, and torque transfer from first input gear 40 to first main shaft 71 is cut off, that is, power transfer from first input gear 40 to first main shaft 71 is blocked. On the other hand, when first pullrod 77a moves toward first clutch 74, the plurality of clutch plates and plurality of friction plates come into close contact with each other. By this operation, first clutch 74 is placed in an engaged state, and torque is transferred to first main shaft 71, that is, power transfer is performed for odd-numbered gears including a group of odd-numbered gears (first gear 81, third gear 83, and fifth gear 85). In this manner, with first clutch 74, torque capacity is changed and transfer torque to first main shaft 71 is adjusted according to the degree that first pullrod 77a is moved.

Based on a control command from control unit 300, first clutch actuator 77 adjusts the engagement force acting on first main shaft 71 in first clutch 74, that is, the transfer torque from first clutch 74 to first main shaft 71. By this operation, transfer or blocking of power from the engine to first main shaft 71 is performed, and the vehicle starts or stops.

First clutch actuator 77 adjusts the transfer torque of the first clutch 74 by hydraulic pressure.

Torque transferred to first main shaft 71 is output from drive shaft 73 via a desired gear pair among the odd-numbered gears 81, 83, 85, 711, 712, and 731, that is, a pair from gears 711, 85, and 712 on first main shaft 71 and gears 81, 731, and 83 on drive shaft 73 corresponding to the gears on first main shaft 71.

Second clutch 75 transfers rotational power from the engine to second main shaft 72 via crankshaft 60 in an engaged state, and blocks rotational power to second main shaft 72 in a disengaged state.

Second clutch 75 operates in an engaged state and a disengaged state through driving second clutch actuator 78. That is, the torque capacity of second clutch 75 is changed by driving second clutch actuator 78.

Here, second clutch 75 is coupled to second pullrod 78a of second clutch actuator 78, and is placed in an engaged state or disengaged state through forward/backward movement of second pullrod 78a. With second clutch 75, when second pullrod 78a is pulled in a direction to separate from second clutch 75, a plurality of clutch plates and a plurality of friction plates (not shown) are separated from each other. By this operation, second clutch 75 is placed in a disengaged state, and torque transfer from second input gear 50 to second main shaft 72 is cut off, that is, power transfer from second input gear 50 to second main shaft 72 is blocked. On the other hand, when second pullrod 78a moves toward second clutch 75, the plurality of clutch plates and plurality of friction plates come into close contact with each other. By this operation, second clutch 75 is placed in an engaged state, and torque is transferred to second main shaft 72, that is, power transfer is performed for even-numbered gears including a group of even-numbered gears (second gear 82, fourth gear 84, and sixth gear 86). In this manner, with second clutch 75, torque capacity is changed and transfer torque to second main shaft 72 is adjusted according to the degree second pullrod 78a is moved.

Based on a control command from control unit 300, second clutch actuator 78 adjusts the engagement force acting on second main shaft 72 in second clutch 75, that is, the transfer torque from second clutch 75 to second main shaft 72. By this operation, transfer or blocking of power from the engine to second main shaft 72 is performed, and the vehicle starts or stops.

Second clutch actuator 78 is configured in a similar manner to first clutch actuator 77, and drives second clutch 75 by the same kind of operation as that by which first clutch actuator 77 drives first clutch 74.

Furthermore, while the vehicle is moving, first clutch actuator 77 and second clutch actuator 78 perform gear change operations by switching the torque transfer path inside the transmission by operating first clutch 74 and second clutch 75.

Here, first clutch actuator 77 and second clutch actuator 78 have been assumed to be hydraulic, but they may be of any configuration, including electrical, as long as that configuration adjusts the engagement force acting on a clutch.

Torque transferred to second main shaft 72 is output from drive shaft 73 via a desired gear pair among the even-numbered gears 82, 84, 86, 721, 722, and 732, that is, a pair from gears 721, 86, and 722 on second main shaft 72 and gears 82, 732, and 84 on drive shaft 73 corresponding to the gears on second main shaft 72.

In this manner, power transferred to first main shaft 71 and second main shaft 72 is transferred to drive shaft 73 placed toward the rear of the vehicle via gears 81 through 86, 711, 712, 721, 722, 731, and 732 through appropriately configured selected transmission gears.

Sprocket 76 is fixed to one end (the left end) of drive shaft 73. Drive chain 13 (see FIG. 1) wound around sprocket 76 is wound around a sprocket provided on a rotating shaft of rear wheel 19, and the driving force is transferred from transmission 160 to rear wheel 19 via drive chain 13 (see FIG. 1) through the rotation of sprocket 76 due to the rotation of drive shaft 73. In other words, torque generated by the engine is output from drive shaft 73 via first clutch 74 or second clutch 75 and a predetermined gear train corresponding to the relevant transmission gear, and rotates the rear wheel 19.

The transmitting portion of the driving force output to drive shaft 73 via odd-numbered gears (gears 81, 83, 85, 711, 712, and 731) on first main shaft 71, and the transmitting portion of the driving force output to drive shaft 73 via even-numbered gears (gears 82, 84, 86, 721, 722, and 732) on second main shaft 72 have approximately the same outer diameter. Also, the driving force transmitting portion in first main shaft 71 and the driving force transmitting portion in second main shaft 72 are placed so as not to overlap concentrically. In transmission mechanism 70, first main shaft 71 and second main shaft 72 having approximately the same outer diameter are placed side by side laterally on the same axis line, and rotate independently of each other.

Transmission gears 711, 85, and 712 defining odd-numbered gears are placed on first main shaft 71. Specifically, the following gears are arranged on first main shaft 71 in order from the base end to which first clutch 74 is connected: fixed gear (also referred to as "first-equivalent gear") 711, fifth gear 85, and spline gear (also referred to as "third-equivalent gear") 712.

Fixed gear 711 is integral with first main shaft 71 and rotates together with first main shaft 71. Fixed gear 711 meshes with first gear (driven gear) 81 of drive shaft 73, and is also referred to here as "first-equivalent gear."

Fifth gear 85 is attached to first main shaft 71 so as to be rotatable about the axis of first main shaft 71 with its movement regulated in the axial direction at a position between, and at a distance from, first-gear fixed gear 711 and third-gear spline gear 712.

Fifth gear 85 meshes with spline gear (fifth-equivalent gear as a driven gear) 731 of drive shaft 73.

Spline gear 712 is attached to first main shaft 71 at the front end of first main shaft 71, that is, at the distant end from first clutch 74 so as to be able to move in the axial direction, and rotates together with the rotation of first main shaft 71.

Specifically, spline gear 712 is attached to first main shaft 71 so as to be able to slide in the axial direction while its rotation is regulated by splines formed along the axial direction on the outer periphery of the front end of first main shaft 71, and meshes with third gear (driven gear) 83 of drive shaft 73. The spline gear 712 is coupled to shift fork 142 and moves on first main shaft 71 in the axial direction through movement of shift fork 142. Spline gear 712 is also referred to here as "third-equivalent gear."

Spline gear 712 moves toward fifth gear 85 on first main shaft 71 and engages with fifth gear 85, and regulates turning (idling) about the axis of fifth gear 85 on first main shaft 71. Through the engagement of spline gear 712 with fifth gear 85, fifth gear 85 is fixed to first main shaft 71 and is made integrally rotatable together with the rotation of first main shaft 71.

On the other hand, gears 72, 86, and 722 defining even-numbered gears are arranged on second main shaft 720. Specifically, the following gears are arranged on second main shaft 72 in order from the base end to which second clutch 75 is connected: fixed gear (second-equivalent gear) 721, sixth gear 86, and spline gear (fourth-equivalent gear) 722.

Fixed gear 721 is integral with second main shaft 72 and rotates together with second main shaft 72. Fixed gear 721 meshes with second gear (driven gear) 82 of drive shaft 73, and is also referred to here as "second-equivalent gear."

Sixth gear 86 is attached to second main shaft 72 so as to be rotatable about the axis of first main shaft 72 with its movement regulated in the axial direction at a position between, and at a distance from, fixed gear 721, which is second gear, and spline gear 722, which is fourth gear. This sixth gear 86 meshes with spline gear 732 (sixth-equivalent gear as a driven gear) of drive shaft 73.

Spline gear (fourth-equivalent gear) 722 is attached to second main shaft 72 at the front end of second main shaft 72, that is, at the distant end from second clutch 75, so as to be able to move in the axial direction and rotates together with the rotation of second main shaft 72.

Specifically, spline gear 722 is attached to second main shaft 72 so as to be able to slide in the axial direction while its rotation with respect to second main shaft 72 is regulated by splines formed along the axial direction on the outer periphery of the front end of second main shaft 72, and meshes with fourth gear (driven gear) 84 of drive shaft 73. This spline gear 722 is coupled to shift fork 143, and moves on second main shaft 72 in the axial direction through movement of shift fork 143.

Spline gear 722 moves toward fifth gear 86 on second main shaft 72 and engages with sixth gear 86, and regulates turning (idling) about the axis of sixth gear 86 on second main shaft 72. Through the engagement of spline gear 722 with sixth gear 86, sixth gear 86 is fixed to second main shaft 72 and is made integrally rotatable together with the rotation of second main shaft 72.

Meanwhile, the following gears are arranged on drive shaft 73 in order from the first clutch 74 side: first gear 81, spline gear (fifth-equivalent gear) 731, third gear 83, fourth gear 84, spline gear (sixth-equivalent gear) 732, second gear 82, and sprocket 76.

First gear 81, third gear 83, fourth gear 84, and second gear 82 are provided rotatably about drive shaft 73 in a state in which their movement in the axial direction of drive shaft 73 is inhibited.

Spline gear (fifth-equivalent gear) 731 is attached to drive shaft 73 so as to be able to slide in the axial direction while its turning is regulated by spline engagement. That is, spline gear 731 is attached so as to be able to move in a sliding direction with respect to drive shaft 73, and also rotates together with drive shaft 73. The spline gear 731 is coupled to shift fork 141 in shift mechanism 140, and moves on drive shaft 73 in the axial direction through the movement of shift fork 141.

Spline gear (sixth-equivalent gear) 732 is attached to drive shaft 73 so as to be able to slide in the axial direction while its turning is regulated by spline engagement. That is, spline gear (sixth-equivalent gear) 732 is attached so as to be able to move in a sliding direction with respect to drive shaft 73, and also rotates together with drive shaft 73. The spline gear 732 is coupled to shift fork 144 in shift mechanism 140, and moves on drive shaft 73 in the axial direction through the movement of shift fork 144.

Sprocket 76 is fixed to the end of drive shaft 73 located on the second clutch 75 side.

The spline gears 712, 722, 731, and 732 function as transmission gears, and also function as dog selectors. Specifically, mutually fitting concave and convex sections are provided on mutually opposing surfaces of spline gears 712, 722, 731, and 732 and adjacent transmission gears in the axial direction, and both gears rotate integrally through the fitting together of the concave and convex sections.

Thus, spline gears 712, 722, 731, and 732 are coupled by a dog mechanism to respective transmission gears (first gear 81 through sixth gear 86) that are adjacent in the axial direction by being moved in the axial direction by coupled shift forks 141 through 144.

Gear shifting performed for gears 81 through 86, 711, 712, 721, 722, 731, and 732 in transmission mechanism 70 is performed by shift forks 141 through 144 that are movable by the rotation of shift cam 14 in shift mechanism 140.

Shift mechanism 140 includes shift forks 141 through 144, shift cam drive unit 146 that provides rotational driving of shift cam 14, motor 145, and drive mechanism 41 that couples motor 145 to shift cam drive unit 146 and transfers the driving force of motor 145 to shift cam drive unit 146.

Shift forks 141 through 144 are installed between spline gears 731, 712, 722, and 732 and shift cam 14, and are arranged a distance from each other in the axial direction of first and second main shafts 71 and 72, drive shaft 73, and shift cam 14. The shift forks 141 through 144 are preferably arranged so as to be parallel or substantially parallel to each other, and are each placed so as to be able to move in the axial direction of the rotation axis of shift cam 14.

Shift forks 141 through 144 have pin sections at the base end arranged so as to be able to move respectively within four cam grooves 14a through 14d provided in the outer periphery of shift cam 14. That is, shift forks 141 through 144 are follower members of shift cam 14, which is the drive source, and slide in the axial direction of first and second main shafts 71 and 72 and drive shaft 73 in accordance with the shape of cam grooves 14a through 14d of shift cam 14. By this sliding movement, spline gears 731, 712, 722, and 732 coupled to the front end each move in the axial direction on shafts passing through the respective inner diameters.

Shift cam 14 is cylindrical, and is placed so that its rotation axis is parallel or substantially parallel to first main shaft 710, second main shaft 720, and drive shaft 73.

Shift cam 14 is rotated by the driving force of motor 145 transferred to shift cam drive unit 146 via drive mechanism 41. Through this rotation, at least one of shift forks 141 through 144 is moved in the axial direction of the rotating shaft of shift cam 14 in accordance with the shape of cam grooves 14a through 14d.

By movement of shift forks 141 through 144 in response to the rotation of shift cam 14 including cam grooves 14a through 14d, a spline gear coupled to a moved shift fork moves, and a gear shift of transmission 160 (transmission mechanism 70) is performed. In other words, motor 145 performs a gear shift by rotating shift cam 14 of shift mechanism 140.

In transmission 160, engine driving force is transferred to drive shaft 73 via two independent systems including first and second main shafts 71 and 72, respectively, by operations of first and second clutches 74 and 75 and the shift mechanism 140. Drive sprocket 76 rotates together with the rotation of drive shaft 73, and rotates the rear wheel via a chain, for example.

First clutch 74, second clutch 75, and shift mechanism 140 in transmission 160 are controlled by control unit 300 via first clutch actuator 77, second clutch actuator 78, and motor 145. Based on input signals, control unit 300 controls the operation of first clutch actuator 77, second clutch actuator 78, and motor 145 at predetermined timings. Through the operation of first clutch actuator 77, second clutch actuator 78, and motor 145 in this manner, first clutch 74, second clutch 75, and the transmission gears are operated, and transmission gear change operations are performed.

Control unit 300 controls each section of the vehicle, such as transmission 160 and engine 20 (see FIG. 1) based on signals input from mode switching switch 110, shift switch 120, lever operation amount detection section 130 that detects an amount of lever operation of clutch lever 200, and sensor group 150.

In particular, control unit 300 controls transmission 160 according to a mode selected by operation of mode switching switch 110. Control unit 300 controls a gear change operation in transmission 160 by operation of shift switch 120.

Control unit 300 also controls transfer torque (clutch torque capacity) in clutches (here, first clutch 74 and second clutch 75) according to the operation of clutch lever 200. Control of transmission 160 by control unit 300 will be described in detail below.

Also, a throttle opening signal is input to control unit 300 from a throttle input potentiometer in sensor group 150. By this operation, control unit 300 controls the supply of a fuel-air mixture to the inside of an engine cylinder by controlling a throttle valve of engine 20 (see FIG. 1).

Mode switching switch 110 is a switch that selects an operation mode used by the transmission. Here, mode switching switch 110 makes a selection by switching between "3-pedal mode" and "2-pedal mode," and outputs a selected mode signal to control unit 300.

Here, "3-pedal mode" is a mode in which the transmission is operated by three pedals: an accelerator pedal (accelerator grip), brake pedal, and clutch pedal (clutch lever), while "2-pedal mode" is a mode in which there is no clutch pedal (clutch lever) as in the "3-pedal mode," and the transmission is operated by an accelerator pedal (accelerator grip) and brake pedal. With the transmission of the present preferred embodiment, when in "2-pedal mode" gear shift control can be performed based on an image of an AMT mode in which an operator can perform shift operation and an AT mode in which an operator can perform an N→first gear shift operation. Also, in the present preferred embodiment, when in "3-pedal mode," gear shift control can be performed based on an image of an MT mode and a semi-MT mode in which only clutch operation at the time of a gear change is performed automatically (see FIG. 11).

Shift switch 120 is provided on the left-side handlebar of handle 15. Shift switch 120 includes a shift-up button and shift-down button. When the shift-up button is pressed by the operator, transmission 160 executes a shift-up operation via control unit 300, and when the shift-down button is pressed by the operator, transmission 160 executes a shift-down operation via control unit 300.

Also, shift switch 120 has a function for setting gear shift control to AMT mode in which shift operation (transmission gear changing) can be performed at the time of a gear change by being pressed in "2-pedal mode," and setting AT mode if not pressed.

As shown in FIG. 1, clutch lever 200 is placed on the left-side handlebar of handle 15, and can be grasped by an operator together with the left-hand grip.

Clutch lever 200 is preferably a by-wire type of clutch lever. With clutch lever 200, a degree of operation of the lever when gripped by the operator (angle θ between the normal position of lever body 220 and its position when operated shown in FIG. 3) is detected by lever operation amount detection section 130. Lever operation amount detection section 130 converts the detected lever operation amount to an electrical signal and outputs this signal to control unit 300.

Figure 3:
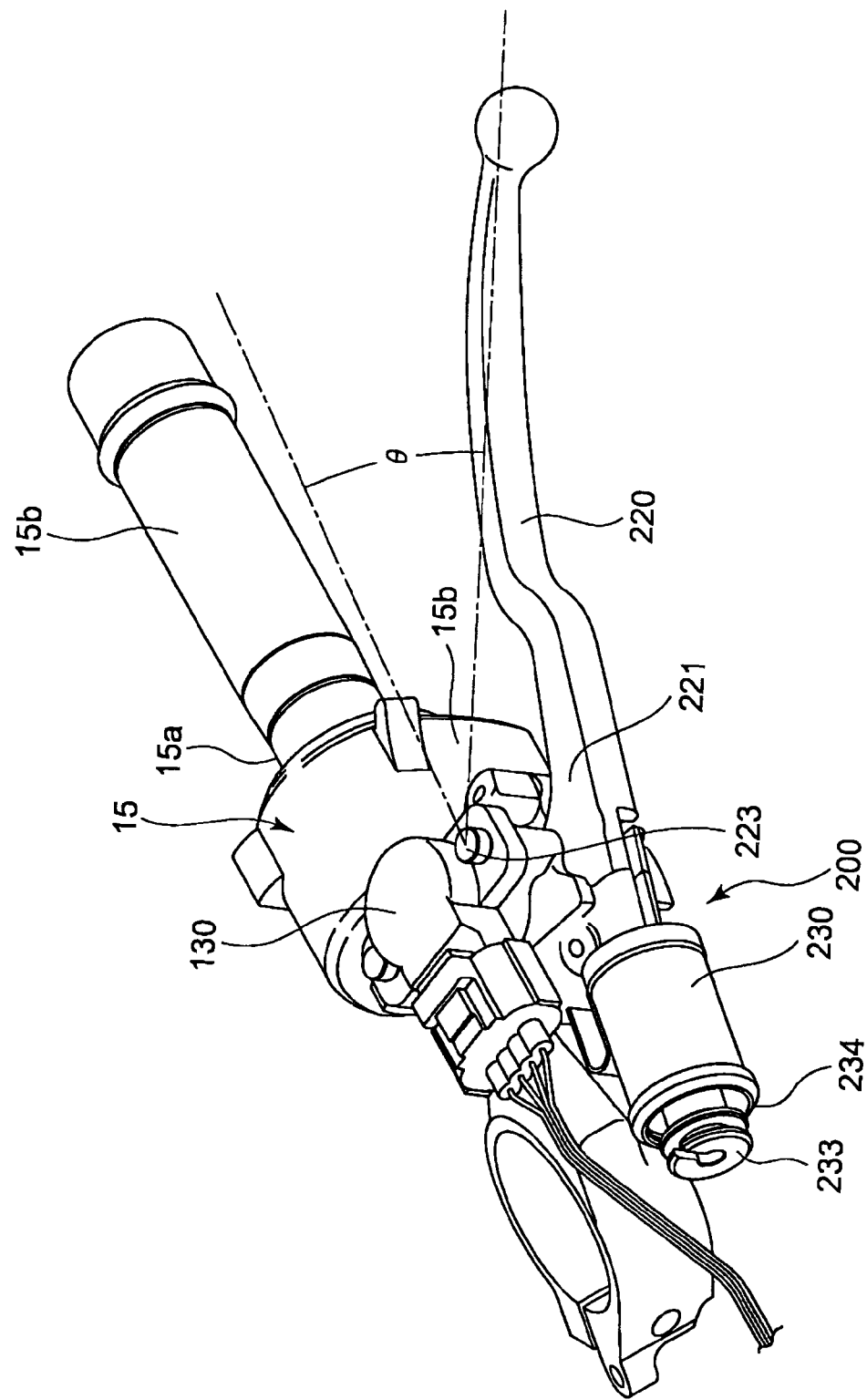
FIG. 3 is a perspective view of a left-side handlebar on a handle provided to explain a clutch lever.

FIG. 3 is a perspective view of a left-side handlebar on a handle to explain clutch lever 200.

As shown in FIG. 3, clutch lever 200 is placed opposite grip 15b on left-side handlebar 15a of handle 15, and has lever body 220 to be gripped by the operator. Base end 221 of lever body 220 is rotatably attached to the base of left-side handlebar 15a via shaft 223.

Through rotation of lever body 220, that is, movement of the tip of lever body 220 toward grip 15b, the other end 232b of wire 232 inserted inside lever cylinder 230 (see FIGS. 4A and 4B) is pulled.

Figure 4:
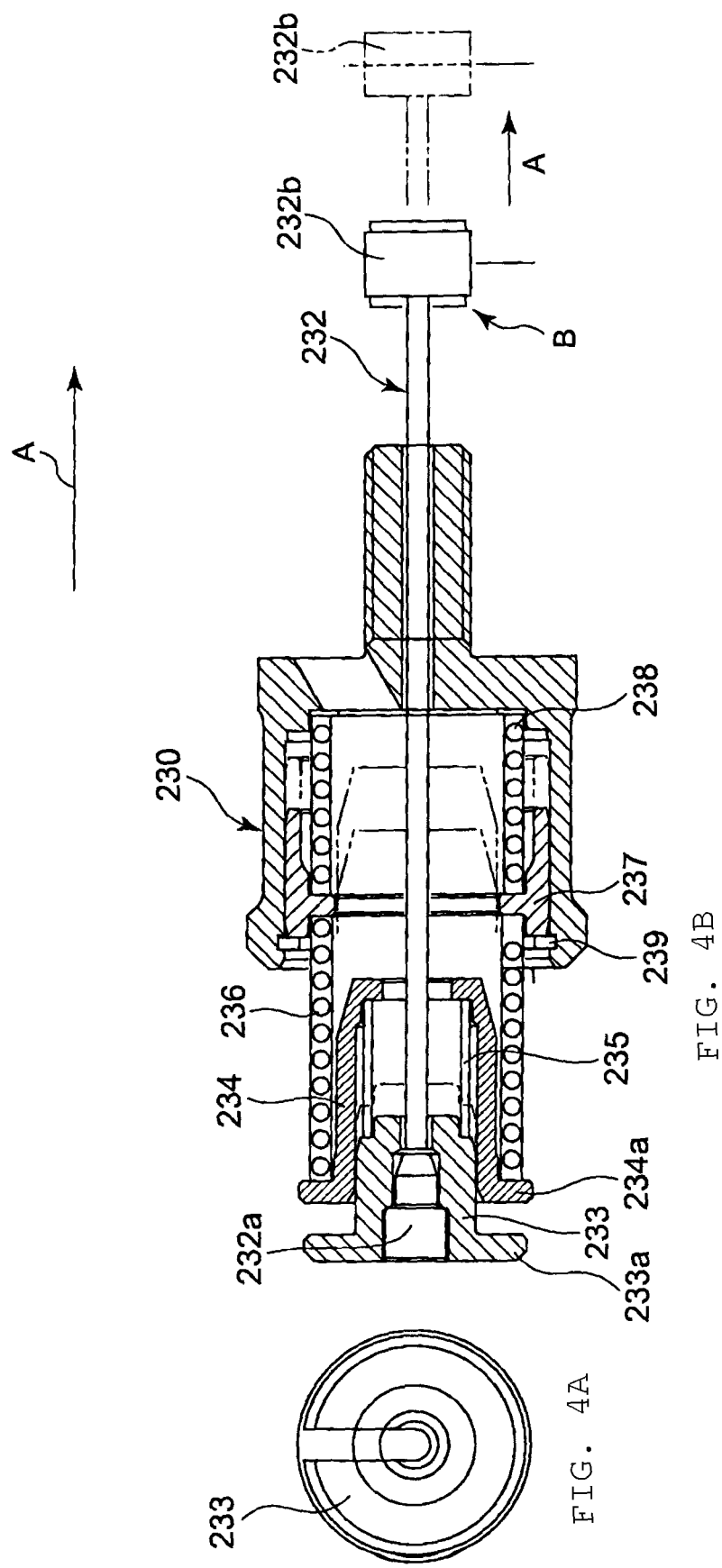
FIGS. 4A and 4B are drawings showing the configuration of a lever cylinder.

FIGS. 4A and 4B are drawings showing the configuration of a lever cylinder, in which FIG. 4A is a right side view of the lever cylinder and FIG. 4B is a cross-sectional diagram of the lever cylinder.

As shown in FIGS. 4A and 4B, wire 232 is passed through the inside of lever cylinder 230, which is an enclosed cylinder with one end closed off, and is secured to first retainer 233 placed on the bottom side of lever cylinder 230 by one end 232a, and secured to lever body 220 by other end 232b.

First retainer 233 is inserted into second retainer 234 via first coil spring 235, and is movable against the force of first coil spring 235 in the direction of insertion. Movement of first retainer 233 in the direction of insertion is restricted by flange 233a.

Second retainer 234 is inserted inside second coil spring 236, and is latched at one end of second coil spring 236 by flange 234a. Second coil spring 236 is longer than the length of second retainer 234, and its other end is in contact with free piston 237 placed so as to be able to move in an axial direction inside lever cylinder 230.

Free piston 237 is placed inside lever cylinder 230 in a state in which it is biased in the direction lever cylinder 230 is open, that is, toward second coil spring 236, by third coil spring (compression coil spring) 238. Third coil spring 238 is placed inside lever cylinder 230 in a preloaded state so as to contract when second coil spring 236 contracts and a force greater than or equal to a predetermined force is obtained. Free piston 237 is restricted by circlip 239 so as not to be ejected from inside lever cylinder 230 by force of the preloaded third coil spring 238.

With clutch lever 200 configured in this manner, other end 232b coming out from the axial center of the bottom surface of lever cylinder 230 is engaged at the base end of lever body 220.

When lever body 220 is gripped by the operator and rotates about the base end side by being gripped on the grip 15b side, other end 232b that is at position B in the normal state is pulled in direction A.

By this operation, one end 232a pulls first retainer 233 in direction A, and moves first retainer 233 in direction A against the force of first coil spring 235.

With first retainer 233 moving in direction A, that is, the direction of insertion into second retainer 234, flange 233a pushes flange 234a of second retainer 234, and moves second retainer 234 in direction A against the force of second coil spring 236.

Through the movement of second retainer 234 in direction A, a load is also applied to free piston 237 in direction A, but free piston 237 is biased in the opposite direction to direction A by preloaded third coil spring 238. Consequently, third coil spring 238 counteracts second coil spring 236 until second coil spring 236 that has contracted due to the movement of second retainer 234 obtains a predetermined force. As a result, free piston 237 itself does not move in direction A until the force in direction A due to second coil spring 236 becomes greater than the force of third coil spring 238 in the opposite direction to direction A.

Then, when the force in direction A due to second coil spring 236 becomes greater than the force of third coil spring 238 in the opposite direction to direction A, free piston 237 moves in direction A.

Figure 5:
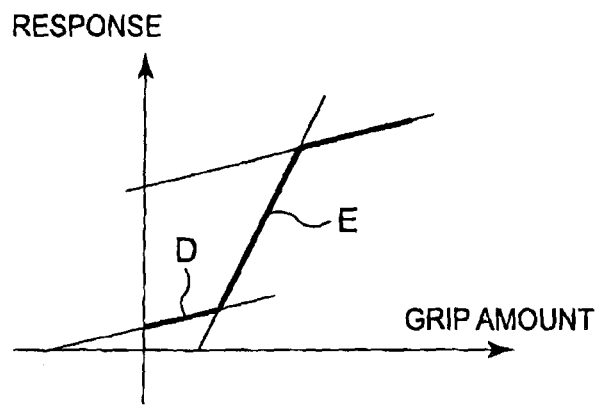
FIG. 5 is a drawing showing the relationship between clutch lever response and grip amount.

FIG. 5 is a drawing showing the relationship between clutch lever response and grip amount.

As shown in FIG. 5, at the start of gripping, section D in which first retainer 233 causes second retainer 234 to contract has a gentler gradient than section E in which second coil spring 236 is made to contract. That is, the force of second retainer 234 is greater than the force of second coil spring 236, and this section in which second coil spring 236 is made to contract is set as a section in which clutch capacity is changed.

Thus, clutch lever 200 is configured so that a rate of increase of operation reaction (response) to an amount of operation of lever body 220 changes in at least two stages. By this operation, the same kind of response can be displayed as with the operation of a mechanical clutch lever, and the same kind of so-called kinesthetic sense can be produced as with the operation of a mechanical clutch lever.

For example, lever operation amount detection section 130 detects the opening when lever body 220 is operated from the normal state, and outputs this to control unit 300. Control unit 300 performs control, in particular, so that the opening of lever body 220 when second coil spring 236 is made to contract corresponds to the clutch torque capacity.

By this operation, the operator can be given a sensation as an amount by which second retainer 234 is made to contract, that is, an amount of play from the start of gripping to a predetermined position. Therefore, after exerting a light grip, the operator can recognize a position at which a load suddenly starts to be applied when gripping lever body 220, and by this can recognize a range in which a load is suddenly applied as a range in which the clutch torque capacity is adjusted.

Figure 6:
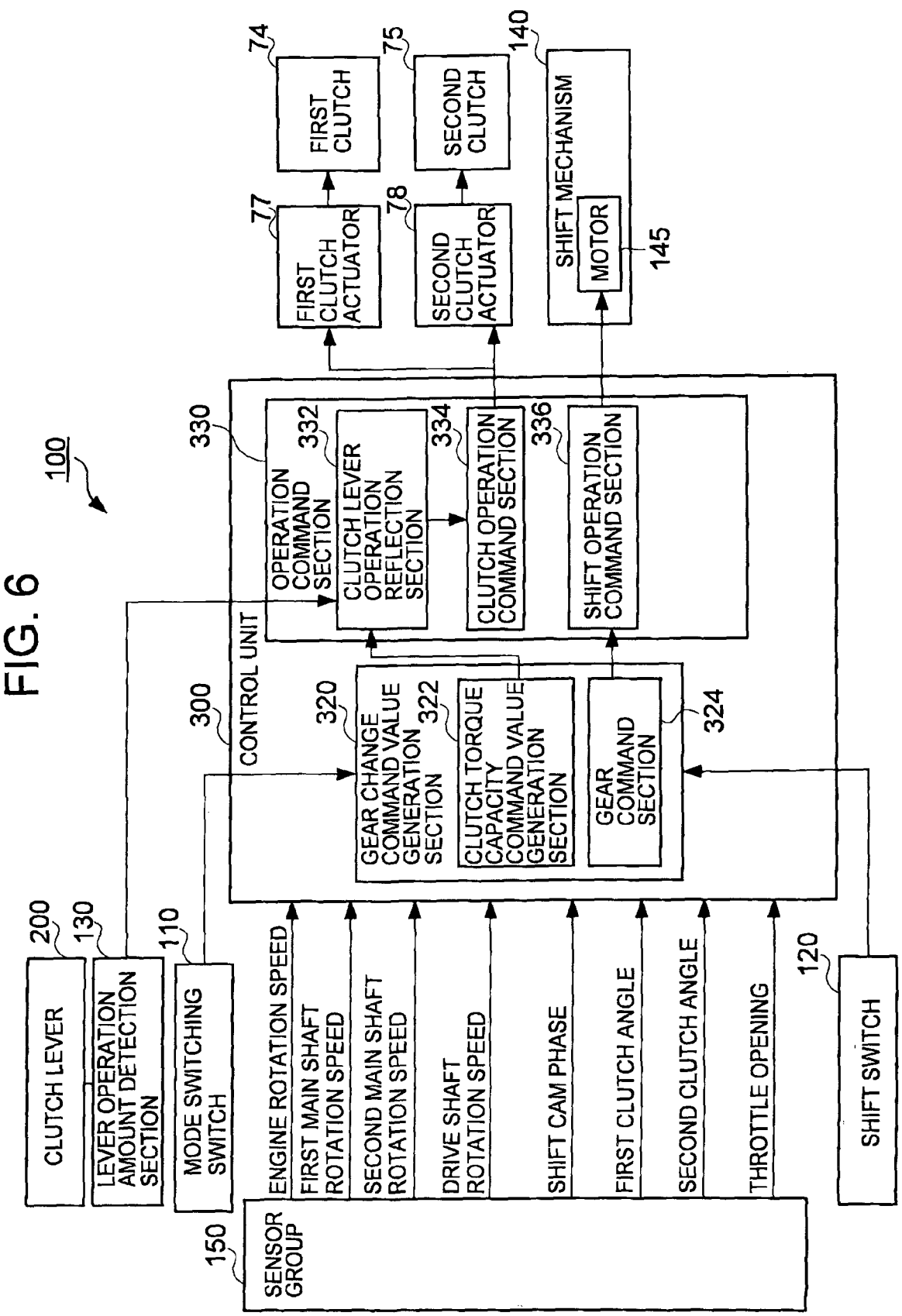
FIG. 6 is a block diagram for explaining a control unit of a transmission according to one preferred embodiment of the present invention.

FIG. 6 is a block diagram for explaining a control unit of a transmission according to one preferred embodiment of the present invention.

In twin-clutch transmission 100 shown in FIG. 6, control unit 300 includes a TCU (Transmission Control Unit) function and an ECU (Engine Control Unit) function.

Control unit 300 both monitors and controls the operating state of the vehicle using information input from mode switching switch 110, lever operation amount detection section 130, sensor group 150, and shift switch 120.

Control unit 300 generates and outputs a clutch torque capacity command value and gear command value, and controls transmission 160 in a mode selected by mode switching switch 110.

In response to operation of shift switch 120, the control unit 300 automatically performs a series of transmission gear change operations by causing first and second clutch actuators 77 and 78 that adjust clutch torque capacity and shift mechanism 140 that performs gear (shift) changing to operate in a coordinated manner. Control unit 300 has a function for controlling transmission 160 as a so-called AMT.

Also, if the operator does not always issue a shift change command by shift switch 120, control unit 300 automatically performs shift selection and all operations (clutch operations) for changing to the selected shift. Control unit 300 has a function for controlling transmission 160 as a so-called AT.

Specifically, control unit 300 includes gear change command value generation section 320 that generates an operation command value that controls transmission 160 based on input information, and operation command section 330 that outputs a final operation command value to transmission 160.

Gear change command value generation section 320 includes clutch torque capacity command value generation section 322 that generates a clutch torque capacity command value relating to automatic gear changing (automatic transmission) and gear command section 324 that specifies a transmission gear.

When automatic gear changing is performed, gear change command value generation section 320 generates a clutch torque capacity command value and gear command value using information input from sensor group 150, and a predetermined program and/or map information internally storing a series of operations including clutch disengagement, transmission gear changing, and clutch engagement.

Also, when shift switch 120 is operated, shift-destination transmission gear command information is input to gear change command value generation section 320 from shift switch 120, and gear change command value generation section 320 prioritizes this input gear command, and generates a clutch torque capacity command value and gear command value using information input from sensor group 150 and a predetermined program and/or map information internally storing a series of operations including clutch disengagement, transmission gear changing, and clutch engagement.

Furthermore, a gear change operation mode switched to by mode switching switch 110 is input to gear change command value generation section 320. Gear change command value generation section 320 generates a clutch torque capacity command value and gear command value when changing gears, when setting off, and when stopping, according to this input mode, and using information input from sensor group 150 and a predetermined program and/or map information internally storing a series of operations including clutch disengagement, transmission gear changing, and clutch engagement.

That is, gear change command value generation section 320 switches between generating a gear command value based on operation of shift switch 120 by the operator, and generating a gear command value using a predetermined program and/or map information internally stored inside gear change command value generation section 320 according to a gear change operation mode switched to by mode switching switch 110, and outputs this from gear command section 324 to operation command section 330.

Also, gear change command value generation section 320 outputs a clutch operation clutch torque capacity command value when changing gears, when setting off, and when stopping, from clutch torque capacity command value generation section 322 to operation command section 330 according to a gear change operation mode switched to by mode switching switch 110.

Control unit 300 (including gear change command value generation section 320 and operation command section 330) detects a driving state of the vehicle by information input from sensor group 150. Information input from sensor group 150 includes, for example, the engine rotation speed, first main shaft rotation speed, second main shaft rotation speed, drive shaft rotation speed, shift cam phase, first clutch angle, second clutch angle, and accelerator position.

Gear change command value generation section 320 outputs a clutch torque capacity command value and gear using the torque of first main shaft 71, the torque of second main shaft 72, the torque of drive shaft 73, and the engine rotation speed corresponding to a gear ratio of each transmission gear set in advance. Gear change command value generation section 320 calculates the torque of first main shaft 71, second main shaft 72, and drive shaft 73 by differentiating the first main shaft rotation speed, second main shaft rotation speed, and drive shaft rotation speed respectively. The drive shaft rotation speed corresponds to the vehicle speed. The shift camphase indicates the rotation angle of shift cam 14 rotating through the operation of motor 145 of shift mechanism 140. By the rotation angle of the shift cam 14 rotation, gear change command value generation section 320 can acquire a predetermined transmission gear (first gear through sixth gear or N) set by rotation of shift cam 14.

Also, the first clutch angle and second clutch angle indicate a state of engagement of first clutch 74 by first clutch actuator 77 and a state of engagement of second clutch 75 by second clutch actuator 78. This first clutch angle and second clutch angle are detected by clutch angle sensors in sensor group 150. Specifically, the first clutch angle indicates the amount of separation between the plurality of clutch plates and the plurality of friction plates in first clutch 74 adjusted by first pullrod 77a (see FIG. 2), that is, the engagement state of first clutch 74, and the second clutch angle indicates the amount of separation between the plurality of clutch plates and the plurality of friction plates in second clutch 75 adjusted by second pullrod 78a (see FIG. 2), that is, the engagement state of second clutch 75. Torque output via the clutches is changed by changes in these clutch angles.

A generated clutch torque capacity command value and gear command value are output to operation command section 330. If a generated clutch torque capacity command value and gear command value are output directly as final operation values, clutch operation and shift operation are performed automatically via first clutch actuator 77, second clutch actuator 78, and shift mechanism 140.

Operation command section 330 controls driving of first clutch 74, second clutch 75, and shift mechanism 140 by outputting a clutch torque capacity command value and gear command value to first clutch actuator 77, second clutch actuator 78, and motor 145 based on the input information.

When clutch lever 200 is operated, an amount of operation of clutch lever 200 is input to operation command section 330.

If there is no input from clutch lever 200, operation command section 330 outputs a clutch torque capacity command value and gear command value generated by gear change command value generation section 320 from clutch operation command section 334 and shift operation command section 336 as final command values. If at least one of an output clutch torque capacity command value and gear command value has been generated by gear change command value generation section 320, it becomes a value to allow a series of operations including clutch disengagement, transmission gear changing, and clutch engagement in coordination with each other.

When an amount of operation of clutch lever 200 is input, clutch lever operation reflection section 332 in operation command section 330 reflects this lever operation amount in a clutch torque capacity value that actually drives first clutch actuator 77 and second clutch actuator 78.

Here, clutch lever operation reflection section 332 cuts off a clutch torque capacity value input to clutch operation command section 334 from clutch torque capacity command value generation section 322. That is, a cut-off clutch torque capacity command value reflecting an amount of lever operation is input to clutch operation command section 334 instead of a clutch torque capacity command value generated by clutch torque capacity command value generation section 322. Then, a clutch torque capacity command value reflecting an amount of lever operation, that is, a clutch torque capacity command value corresponding to an amount of operation of clutch lever 20, is output to first clutch actuator 77 and second clutch actuator 78 via clutch operation command section 334.

Figure 7:
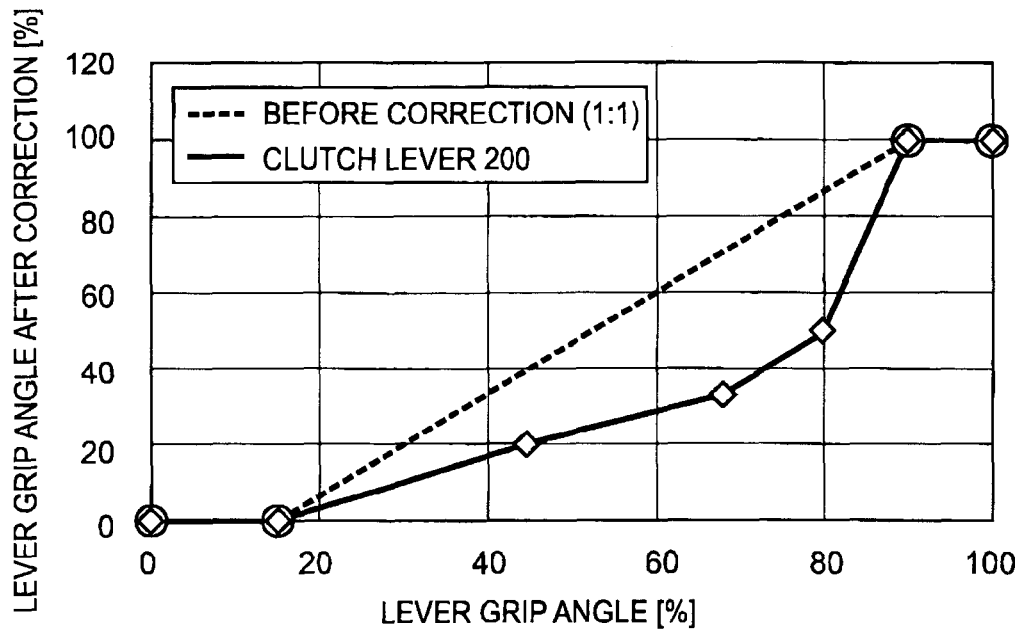
FIG. 7 is a gain map showing a clutch lever grip angle and a lever grip angle after correction.
Figure 8:
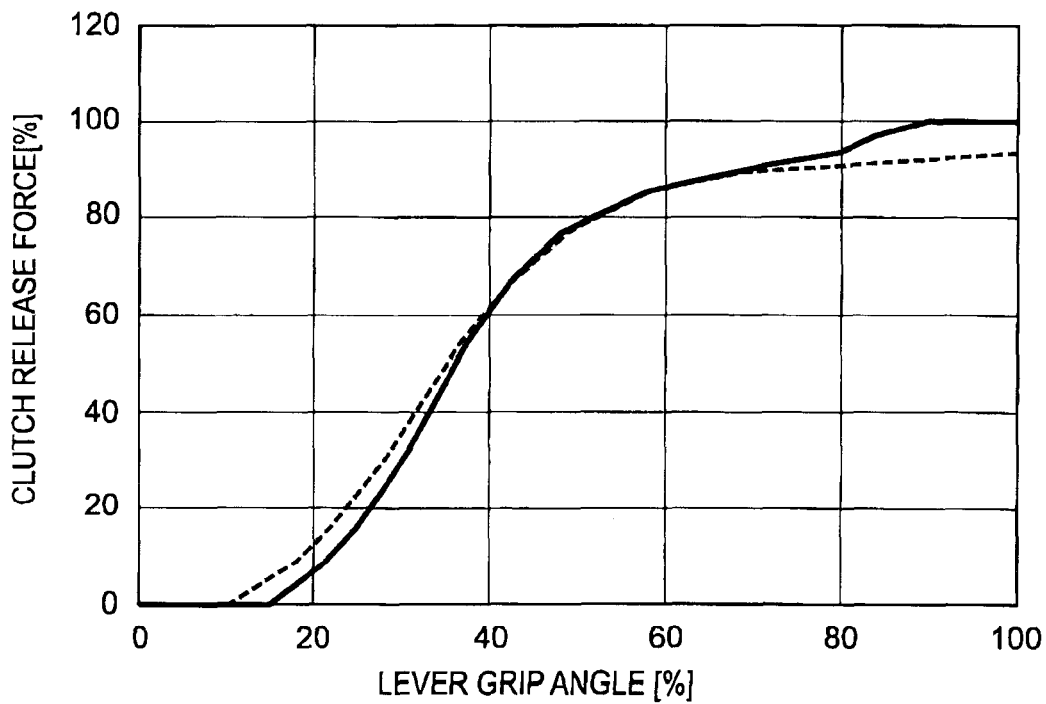
FIG. 8 is a drawing showing a release force of a clutch controlled using a grip angle for a clutch lever after correction.

A clutch torque capacity command value (operation command value) corresponding to an amount of operation of clutch lever 200 is converted using the gain map shown in FIG. 7, and is decided upon as a value satisfying the relationship shown in FIG. 8. FIG. 7 is a gain map showing an angle of clutch lever 200 and a lever grip angle after correction. FIG. 8 shows the release force (engagement state) of a clutch controlled using a grip angle (operation amount) for clutch lever 200 after correction. In FIG. 8, the relationship between a grip angle of clutch lever 200 after correction and clutch lever release force approximates the nonlinear relationship between the grip angle and the clutch release force of a mechanical clutch lever. In FIG. 8, the clutch release force is set so as to engage a clutch within a range of 60% to 80%.

Figure 9:
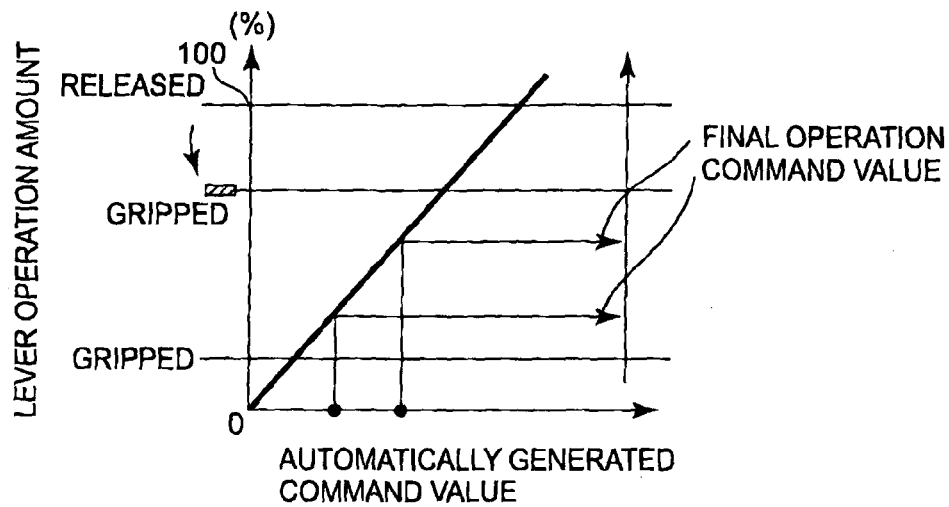
FIG. 9 is a schematic diagram provided to explain processing by a clutch lever operation reflection section.

FIG. 9 is a schematic diagram provided to explain processing by clutch lever operation reflection section 332, and shows the relationship between an amount of operation of clutch lever 200 and a clutch torque capacity command value generated automatically by clutch torque capacity command value generation section 322 (indicated by "automatically generated command value" in FIG. 9). For convenience, FIG. 9 shows a casein which a final clutch torque capacity command value (final operation command value) is output to one of first and second clutch actuators 77 and 78 (also referred to simply as "clutch actuators") for driving either first clutch 74 or second clutch 75. Also, a linear relationship is shown here as an example of the relationship between an amount of lever operation and an automatically generated command value. Furthermore, for the amount of clutch lever operations in FIG. 9, a state in which lever body 220 is fully released is designated 100% opening, and a state in which lever body 220 is fully gripped is designated 0% opening.

As shown in FIG. 9, a clutch torque capacity command value (automatically generated command value) generated by clutch torque capacity command value generation section 322 is constantly input to clutch lever operation reflection section 332 of operation command section 330. When there is no operation of clutch lever 200, an automatically generated command value is output to a clutch actuator as a final operation command value. When clutch lever 200 is operated, an amount of operation of clutch lever 200 is input from lever operation amount detection section 130. According to the degree of the input amount of information of operation of clutch lever 200 (the degree of grip), a command value limit line (a line indicating the maximum value of a clutch capacity command value that varies in accordance with an amount of lever operation) fluctuates on the Y-axis. When this command value limit line is lower than an automatically generated command value, this command value limit line becomes the maximum value of an automatically generated command value, and is output as a final clutch operation command value (final operation command value). That is, the maximum value of an automatically generated command value that is the maximum value of a clutch torque capacity command value for adjusting clutch torque capacity according to an amount of lever operation is limited. Here, clutch operation command section 334 outputs a clutch torque capacity value whose maximum value has been limited to a clutch actuator as a final operation command value. A clutch torque capacity command value that intersects the command value limit line, that is, a clutch torque capacity command value calculated by an amount of lever operation, may also be output as a final operation command value.

Processing that outputs a final operation command value in this manner is performed by clutch lever operation reflection section 332 for both first clutch actuator 77 and second clutch actuator 78.

Clutch lever operation reflection section 332 decides and outputs as a final operation command value a total or approximately total torque capacity after gear ratio conversion for first clutch 74 and second clutch 75 based on operation of clutch lever 200.

Clutch lever operation reflection section 332 may also decide and output as a final operation command value the maximum value of torque capacity after gear ratio conversion for first clutch 74 and second clutch 75 based on operation of clutch lever 200.

Figure 10:
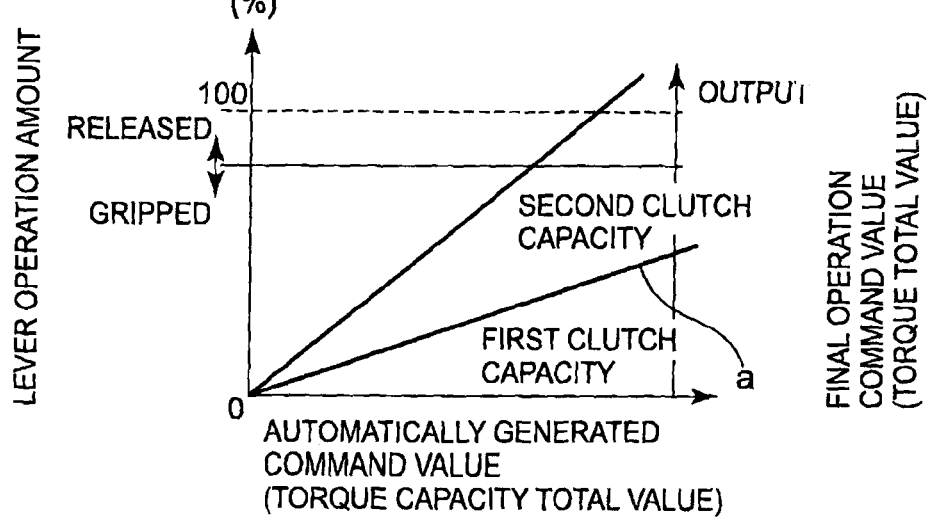
FIG. 10 is a drawing for explaining operation of a total torque amount for a first clutch and a second clutch after gear ratio conversion.

FIG. 10 is a drawing for explaining operation of a total torque amount for first clutch 74 and second clutch 75 after gear ratio conversion. FIG. 10 shows the relationship between an amount of operation of clutch lever 200, a clutch torque capacity command value generated automatically by clutch torque capacity command value generation section 322 (indicated by "automatically generated command value" in FIG. 10), and a clutch torque capacity total value. The relationship between an amount of lever operation and an automatically generated command value is shown as a linear relationship as an example. For the amount of clutch lever operations in FIG. 10, a state in which lever body 220 is fully released is designated 100% opening, and a state in which lever body 220 is fully gripped is designated 0% opening.

An automatically generated command value shown in FIG. 10 corresponds to a total value of a first clutch 74 clutch capacity and second clutch 75 clutch capacity shown by an area delimited by gradient a that varies according to gear ratios.

As shown in FIG. 10, an automatically generated command value that is the total torque capacity of first clutch 74 and second clutch 75 generated by clutch torque capacity command value generation section 322 is constantly input to clutch lever operation reflection section 332 of operation command section 330. An automatically generated command value is a total of first clutch 74 and second clutch 75 torque capacity after gear ratio conversion, that is, when converted on crankshaft 60 or drive shaft 73.

The above are calculated based on information input from sensor group 150. When there is no operation of clutch lever 200, an automatically generated command value is output to a clutch actuator by clutch lever operation reflection section 332 as a final operation command value.

When clutch lever 200 is operated, an amount of operation of clutch lever 200 is input from lever operation amount detection section 130. According to the degree of the input amount of information of operation of clutch lever 200 (the degree of grip), a command value limit line (a line indicating the maximum value of a clutch capacity command value that varies in accordance with an amount of lever operation) fluctuates on the Y-axis. When this command value limit line is lower than an automatically generated command value, this command value limit line becomes the maximum value of an automatically generated command value, and is output as a final operation command value. That is, the maximum value of an automatically generated command value indicating the maximum value of a clutch torque capacity command value that adjusts clutch torque capacity according to an amount of lever operation is limited. Here, clutch operation command section 334 outputs a clutch torque capacity value whose maximum value (maximum torque capacity total value) has been limited to a clutch actuator as a final operation command value. By this operation, first clutch 74 and second clutch 75 are controlled by limiting the maximum value of the total torque capacity of first clutch 74 and second clutch 75. In this manner, an operator can perform manual operation, that is, operation performed with MT.

From the above, when, for example, "2-pedal mode" is input to gear change command value generation section 320 from mode switching switch 110, a clutch torque capacity command value used for clutch operation when setting off and when stopping is generated by clutch torque capacity command value generation section 322 of gear change command value generation section 320, and is output to operation command section 330.

Also, when "3-pedal mode" is input to gear change command value generation section 320 from mode switching switch 110, a command value generated by clutch torque capacity command value generation section 322 is output to operation command section 330 directly as a "maximally engage" command value, and is cut off by clutch torque capacity command value generation section 322 by operation of clutch lever 200. A command value corresponding to an amount of lever operation is input to clutch operation command section 334 as a command value after cut-off. Clutch operation command section 334 outputs a command value corresponding to the input lever operation amount as a final operation command value of a clutch torque capacity command value used for clutch operation when setting off and when stopping.

A signal input from shift switch 120 is executed by gear change command value generation section 320 by interrupt processing. Consequently, a gear change operation can be performed by operation command section 330 via shift mechanism 140 according to a gear command by shift switch 120 by operation of shift switch 120 at any time and at any timing in either "2-pedal mode" or "3-pedal mode." Gear change command value generation section 320 does not accept shift switch 120 interrupt processing during a series of gear change operations including clutch disengagement, gear changing, and clutch engagement, performed in that order.

That is, when the operator presses the shift-up button or shift-down button of shift switch 120, a signal indicating that fact (hereinafter referred to as a "shift signal") is output from shift switch 120 to control unit 300. Based on the input shift signal, control unit 300 controls first and second clutch actuators 77 and 78 and motor 145. By this control, either first clutch 74 or second clutch 75, or both first and second clutches 74 and 75, is/are disengaged, shift cam 14 rotates, and a gear shift of transmission 160 (to be precise, transmission mechanism 70) is performed.

In the present preferred embodiment, a shift-up operation is executed by transmission 160 when the shift-up button is pressed by the operator, and a shift-down operation is executed by transmission 160 when the shift-down button is pressed by the operator.

Figure 11:
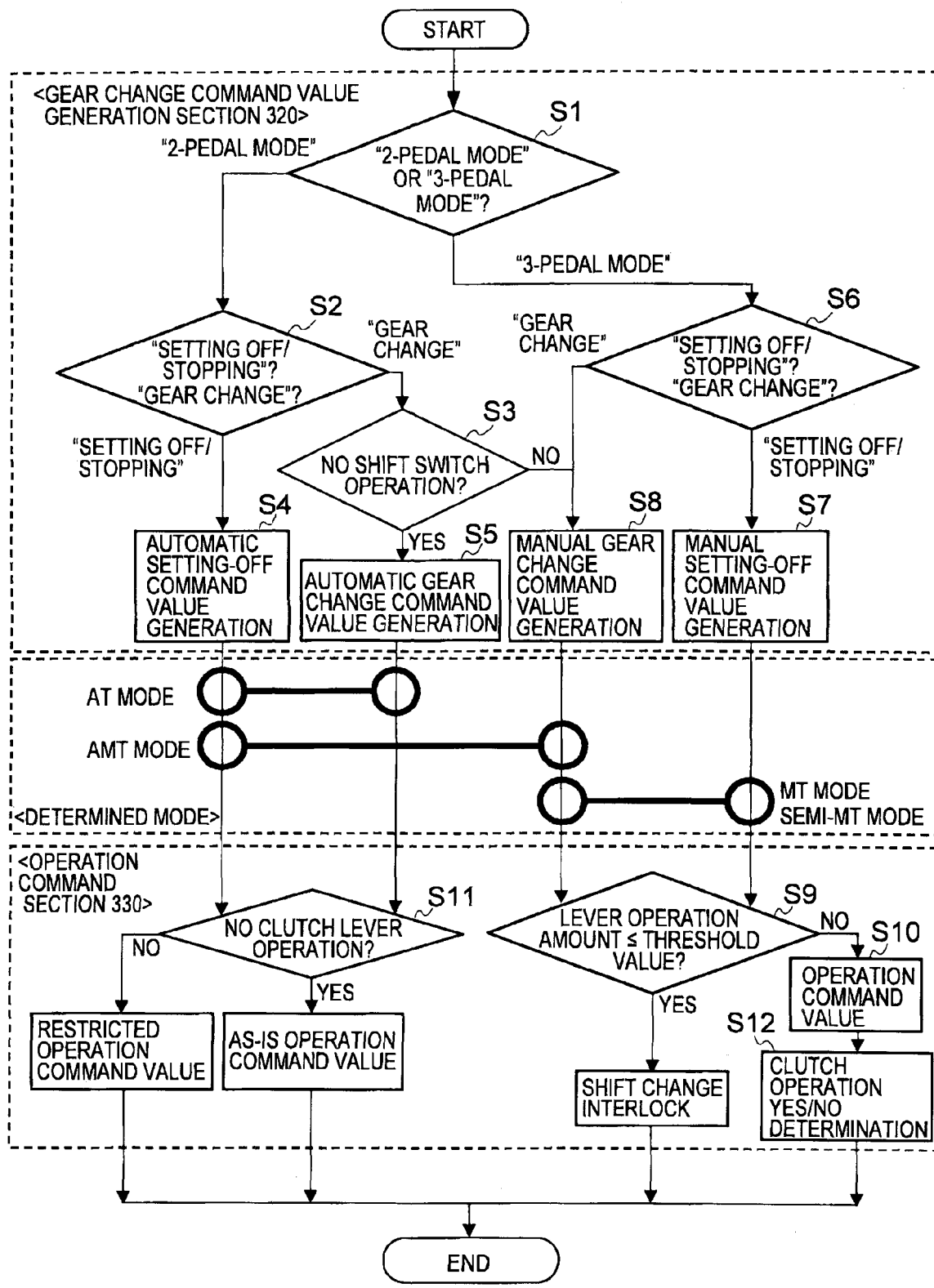
FIG. 11 is a drawing provided to explain mode transition processing by a control unit.

FIG. 11 is a drawing provided to explain mode transition processing by a control unit. In FIG. 11, step numbers are assigned to main processing, and are omitted for other processing. Control unit 300 repeats the processing in FIG. 11 from power-on until power-off.

In step S1, gear change command value generation section 320 determines whether a mode selected by mode switching switch 110 is "2-pedal mode" or "3-pedal mode." If the mode is "2-pedal mode," the processing flow proceeds to step S2.

In step S2, gear change command value generation section 320 determines whether the driving state is a setting-off or stopping situation, or a gear changing situation. If the determination is that this is a setting-off or stopping situation, the processing flow proceeds to step S4 in which an automatic set-off or automatic stop command value is generated, whereas if the determination is that this is not a setting-off or stopping situation, the processing flow proceeds to step S3 in which it is determined whether or not there is input of a shift signal from shift switch 120.

In step S4, gear change command value generation section 320 outputs a clutch torque capacity command value from clutch torque capacity command value generation section 322 as a clutch torque capacity command value that is output to first clutch actuator 77 and second clutch actuator 78 when setting off and when stopping. That is, if there is no operation of clutch lever 200, operation command section 330 performs control by a mode ("AT mode") in which a clutch torque capacity command value from clutch torque capacity command value generation section 322 is not cut off, but is output to first clutch actuator 77 and second clutch actuator 78.

In step S3, it is determined whether or not there is shift switch 120 operation, that is, whether or not there is input of a shift signal from shift switch 120, in 2-pedal mode. If there is no shift signal input in step S3, the processing flow proceeds to step S5 and AT mode gear change control is continued, whereas if there is a shift signal input, the processing flow proceeds to step S8 and AMT mode gear change control is performed.

In step S5, gear change command value generation section 320 outputs a clutch torque capacity command value from clutch torque capacity command value generation section 322 as a clutch torque capacity command value that is output to first clutch actuator 77 and second clutch actuator 78 when changing gears. That is, if there is no operation of clutch lever 200, operation command section 330 performs control in a mode ("AT mode") in which a clutch torque capacity command value from clutch torque capacity command value generation section 322 is not cut off, but is output to first clutch actuator 77 and second clutch actuator 78. If there is no interrupt from shift switch 120, a gear command value output from gear command section 324 at this time is a gear shift to a gear output from gear command section 324 inside gear change command value generation section 320, and is coordinated with a clutch torque capacity command value output from clutch torque capacity command value generation section 322.

In step S8, control unit 300 performs a gear change in so-called AMT mode in which the gear is changed to a gear specified by a shift signal from shift switch 120. That is, in step S8, gear command section 326 of gear change command value generation section 320 changes to a gear generated inside gear change command value generation section 320, outputs a gear input from shift switch 120 as a gear command value, and drives shift mechanism 140 by outputting this gear command value to motor 145 via shift operation command section 336.

On the other hand, if gear change command value generation section 320 determines in step S1 that a mode selected by mode switching switch 110 is "3-pedal mode," the processing flow proceeds to step S6.

In step S6, gear change command value generation section 320 determines whether the driving state is a setting-off or stopping situation, or a gear changing situation. If the determination is that this is a setting-off or stopping situation, the processing flow proceeds to step S7 in which an automatic set-off or automatic stop command value is generated, whereas if the determination is that this is not a setting-off or stopping situation, the processing flow proceeds to step S8 in which a gear change command value is generated based on input of a shift signal from shift switch 120.

In step S7, control unit 300 changes to a clutch torque capacity command value generated for performing clutch operation when setting off and when stopping automatically in AT mode, and generates a clutch torque capacity command value for performing clutch operation according to information from clutch lever 200.

That is, in step S7, control unit 300 performs control in a mode in which the operator adjusts clutch torque capacity by operating clutch lever 200 when setting off and when stopping in MT mode and semi-MT mode.

Furthermore, in step S10, control unit 300 determines whether or not clutch lever 200 has been used, and continues to control transmission 160 in "semi-MT mode" if clutch lever 200 has not been used, or controls transmission 160 in "MT mode" if clutch lever 200 has been used.

Specifically, in step S10, operation command section 330 of control unit 300 restricts (cuts off) by clutch lever operation reflection section 332 a clutch torque capacity command value output from clutch torque capacity command value generation section 322 according to the driving state in accordance with an amount of lever operation input from lever operation amount detection section 130 of clutch lever 200. Then the restricted (cut-off) clutch torque capacity command value (the clutch torque capacity command value that reflects operation of clutch lever 200) is output to clutch operation command section 334. Clutch operation command section 334 outputs the clutch torque capacity command value reflecting operation of clutch lever 200 input from clutch lever operation reflection section 332 to first clutch actuator 77 and second clutch actuator 78 as a final clutch torque capacity command value. By this operation, first clutch 74 and second clutch 75 have their clutch torque capacity adjusted by operation of clutch lever 200 by the operator. Thus, clutch operation command section 334 can adjust the driving force output from drive shaft 73.

In "MT mode," "semi-MT mode," and "AMT mode," operation of the clutch lever beyond a threshold value can be made a condition in order to prevent a shift change to a specific gear when the operator erroneously operates the shift switch.

Specifically, in step S9 it is determined whether or not an amount of clutch lever operation exceeds a threshold value, and if the amount of clutch lever operation exceeds the threshold value a shift change to a specific gear is not interlocked (prohibited), whereas if the amount of clutch lever operation does not exceed the threshold value a shift change to a specific gear is interlocked (prohibited).

In gear change command value generation section 320, gear command section 324 outputs a shift signal input by shift switch 120 to shift operation command section 336 as a gear command value by prioritizing that shift signal over an internally generated gear command value. Consequently, except for a shift change to a specific gear for which a condition is that the amount of clutch lever operation should exceed a threshold value, a gear change operation by shift switch 120 is possible in any mode, namely, "2-pedal mode" and "3-pedal mode," or AT mode, AMT mode, semi-MT mode, and MT mode.

Also, control unit 300 determines an "MT mode," "semi-MT mode," "AMT mode," or "AT mode" transition according to a result of determination in step S1 as to whether or not a mode selected by mode switching switch 110 is "2-pedal mode" or "3-pedal mode," a result of determination in step S3 as to whether or not there is input of a shift signal from shift switch 120, and a determination result of step S12 that determines the presence or absence of operation of clutch lever 200 corresponding to step S11 downstream of step S10, and informs the operator of the current driving state by displaying the mode on an instrument panel.

FIG. 12 is a drawing showing each driving mode of a transmission according to the present preferred embodiment. In FIG. 12, "•" means "operation by operator," and "•/time" means that an operator can perform operation within a predetermined time. Also, "⊚," "○," and "Δ" indicate a degree of correspondence of each item.

As shown in FIG. 12, transitions are performed as described below in "2-pedal mode" (AT mode and AMT mode) and "3-pedal mode" (semi-MT mode and MT mode).

"2-Pedal Mode"
Basic State

When setting off, if the shift button of shift switch 120 is pressed by the operator in "2-pedal mode" and "N→first gear (indicated by 'N→1' in FIG. 12)" is specified, the transmission disengages clutches, performs an N→first gear change, and stands by. When the accelerator is opened, that is, based on an accelerator position detected by control unit 300, the transmission operates to engage the clutches, causing the vehicle to set off.

When changing gears, operation of clutch lever 200 and the shift button by the operator is unnecessary, and control unit 300 automatically selects a shift and changes gear.

When stopping, when the vehicle speed decreases the transmission automatically performs a down-shift, and completes a gear change to first gear before the vehicle stops. When the vehicle speed decreases, the transmission stops the vehicle by automatically operating to disengage clutches. The vehicle is kept in first gear. When "1→N" is specified by the shift button by an operation by an operator, the transmission makes a "1→N" gear change and then performs engages clutches.

Basic State Interrupt Operation

When the shift button is pressed (AMT mode) and a certain condition is satisfied in a 2-pedal mode (so-called AT mode) state, 2-pedal mode is returned to.

When the operator grips the clutch lever in 2-pedal mode, clutches are disengaged without the shift changing, and when the clutch lever is returned, clutches are engaged without the shift changing. By this operation, the original 2-pedal mode (AT mode) is returned to.

When the operator grips clutch lever 200 in 2-pedal mode (AT mode), clutches are disengaged without the shift changing.

Then, when the shift button is pressed by the operator, the shift changes while clutches are kept disengaged. Following this, clutches are engaged in the post-change shift by the operator returning clutch lever 200. When a certain condition is satisfied in this state, 2-pedal mode is returned to.

"3-Pedal Mode"
Basic State

When setting off, the operator performs an N→first gear operation by clutch lever 200 and the shift button from an N (neutral) state, and sets off by returning clutch lever 200.

When changing gears, when the operator specifies a gear change destination shift by pressing the shift up button or shift down button, the transmission automatically processes clutch operation and a shift change.

When stopping, clutches are disengaged and the vehicle is stopped by the operator gripping clutch lever 200.

Basic State Interrupt Operation

When the operator grips clutch lever 200 in 3-pedal mode (a mode in which clutch operation is processed automatically when changing gears: semi-MT mode), clutches are disengaged without the shift changing. Following this, clutches are engaged without the shift changing, and the original 3-pedal mode is returned to, by returning the clutch lever.

When the operator grips clutch lever 200 in 3-pedal mode, clutches are disengaged without the shift changing. Following this, the shift changes while clutches are kept disengaged by depressing the shift button. Then, when clutch lever 200 is returned, clutches are engaged after the shift change, and the original 3-pedal mode is returned to.

As shown in FIG. 12, in "3-pedal mode" (MT mode or semi-MT mode), the clutch operation applies as a condition for setting off in addition to shift operation and accelerator operation. Therefore, in "3-pedal mode," when setting off, three kinds of operations by the operator are necessary: shift button operation, accelerator operation, and clutch operation. This enables an immunity to erroneous setting off to be improved as compared with AMT mode, AT mode, and CVT mode.

In addition, the ability to manipulate the engagement state (clutch torque capacity) of first clutch 74 and second clutch 75 by-wire clutch lever 200 enables improvement in the degrees of freedom when accelerating when setting off.

In transmission 160, control unit 300 sets a threshold value for an amount of operation of clutch lever 200, and, depending on the gear, performs shift change operation interlocking in "3-pedal mode" so that gear changing cannot be performed without clutch lever 200 being gripped.

Here, in "3-pedal mode," a predetermined grip of clutch lever 200 is necessary when changing up from N to first gear, when changing down from first gear to N, and when changing down from second gear to first gear. The predetermined grip is judged as a clutch torque capacity command value corresponding to a lever opening that is an amount of lever operation being greater than a prescribed value.

By this operation, in "3-pedal mode," control unit 300 prevents the gear from being shifted from N to first gear and the vehicle from moving while the operator has forgotten to grip the clutch lever when setting off.

Also, an unintended shift from first gear to N while moving can be prevented, and furthermore, an unintended shift from second gear to first gear, which has a very different gear ratio, while moving is prevented.

After power is switched on, control unit 300 (to be precise, clutch lever operation reflection section 332) learns a signal range input from lever operation amount detection section 130 in order to make an output clutch torque capacity command value correspond to an amount of operation of clutch lever 200.

That is, clutch lever operation reflection section 332 learns an operation range for clutch lever 200, that is, a lever grip position and release position, using a signal range output as lever operation amounts from lever operation amount detection section 130 accompanying lever opening and closing operations, and reflects this in a final clutch torque capacity command value.

In "3-pedal mode," if there is no signal input to control unit 300 from lever operation amount detection section 130, and control unit 300 determines via clutch lever operation reflection section 332 that lever operation amount detection section 130 is faulty, a transition is made to "2-pedal mode." By this operation, movement of the vehicle can be continued without degrading functionality in the event of a lever failure. Determination of a fault in the amount of lever operation detection section 130 by control unit 300 is based on the state of the electrical connection to lever operation amount detection section (so-called potentiometer) 130.

Figure 13:
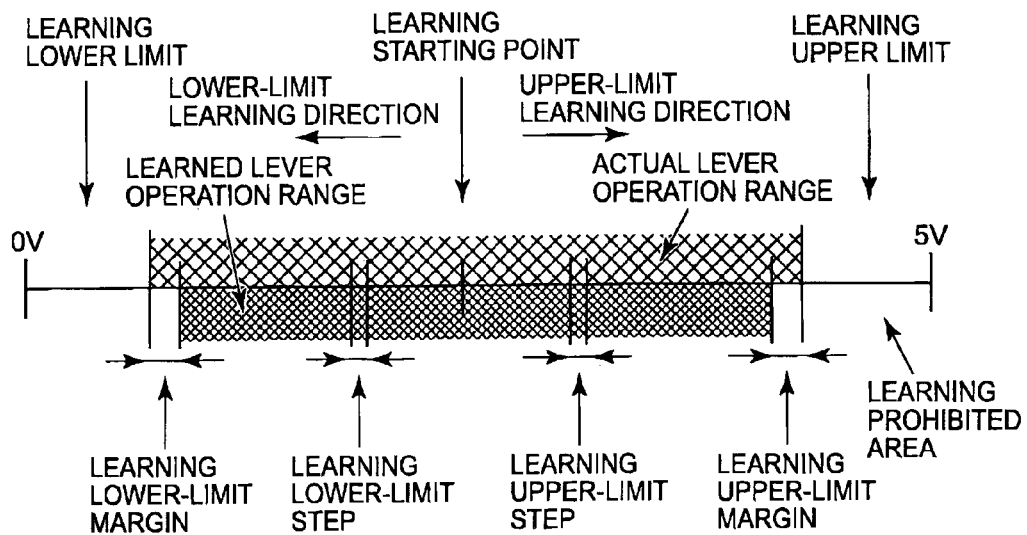
FIG. 13 is a drawing for explaining learning a clutch lever operation range.

FIG. 13 is a drawing for explaining learning of a clutch lever operation range by a control unit.

In FIG. 13, the horizontal axis final clutch torque capacity command values 0 V to 5 V correspond to the opening/closing range of clutch lever 200.

The learning start position is the center position of the learned lever operating range (the learning starting point), and an upper-limit step and lower-limit step are set in advance on either side of this position. Clutch lever operation reflection section 332 starts learning from the center position, begins to learn from a point at which the previously set upper-limit step is exceeded in the learning upper-limit operation range through gripping of clutch lever 200, and terminates learning when the lever reaches the upper limit of the actual lever operation range. A lower limit can be learned in a similar manner through release of the gripped lever. Since the lever operation range can be learned in specific step units in this manner, a full grip position can be learned in one clutch lever 200 gripping operation. The learning upper-limit margin and learning lower-limit margin areas shown in FIG. 13 are to prevent the opening from not returning to 0% or not reaching 100% due to the learning progress situation.

With a vehicle equipped with a transmission, when starting off, clutch lever 200 is firmly gripped once in order to change up from N to first gear. This one-time gripping of clutch lever 200 enables the operation range to be learned, so that a clutch actuator can be operated in an optimal position when the operator next performs clutch operation using clutch lever 200.

Figure 14:
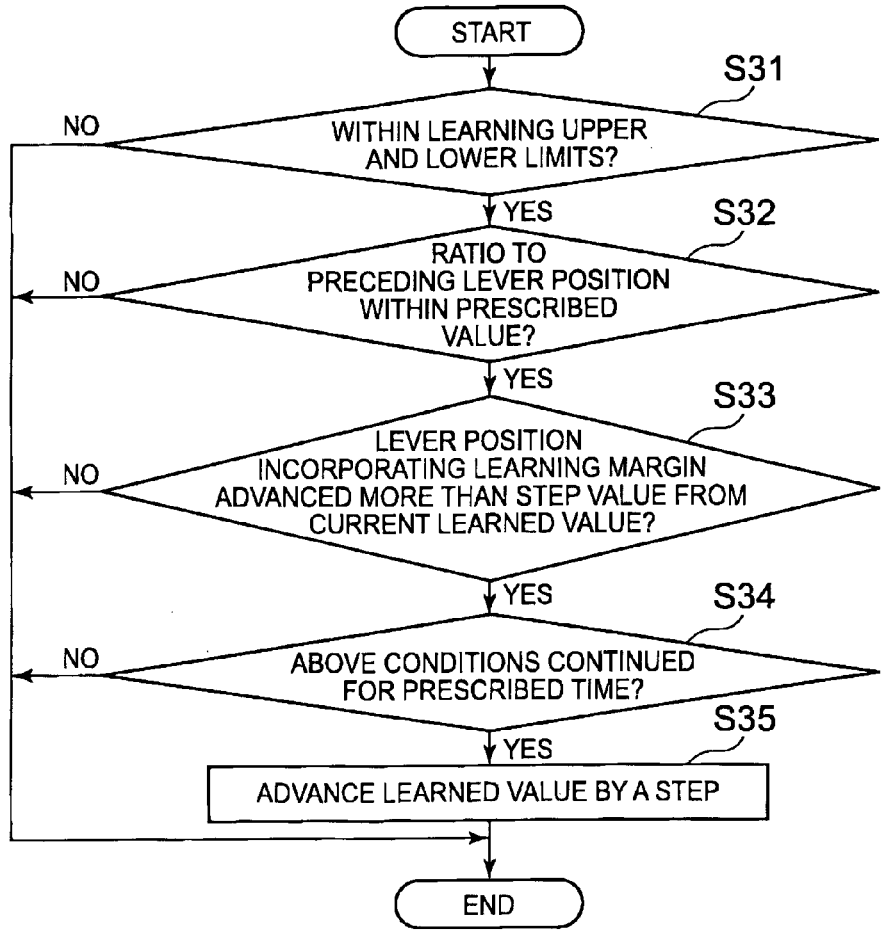
FIG. 14 is a flowchart for explaining learning a clutch lever operation range.

FIG. 14 is a flowchart for explaining learning of a clutch lever operation range. When the clutch lever 200 operating range is learned, "+" from the current lever position indicates the lower-limit learning side, and "−" the upper-limit learning side.

As shown in FIG. 14, control unit 300 (clutch lever operation reflection section 332) first sets an upper-limit step and lower-limit step when power is switched on, and proceeds step-by-step with learned value acquisition by satisfying the following conditions. That is, step-by-step learned value acquisition is proceeded with by satisfying the following conditions: the clutch lever 200 position is within the learning upper and lower limits (step S31), the ratio to the preceding clutch lever 200 lever position is within a prescribed value (step S32), the lever position incorporating a learning margin (current lever position ±learning margin) has advanced more than the step value from the current learned value (step S33), and these conditions (step S31 through step S33) have continued for a prescribed time (steps S34 and s35).

In the present preferred embodiment, even with DCT, the manner in which driving force is restored when changing gears can be adjusted by operating clutch lever 200. For example, if a child or elderly person is also mounted on the vehicle, when performing clutch re-engagement at the time of a gear change, torque capacity can be increased slowly, and output driving force can be increased gradually. Also, driving force can be adjusted without an accompanying gear change. For example, when a vehicle in which a transmission is mounted is in a traffic jam or is moving alongside a pedestrian, the vehicle can run in a half-clutch state without gear changes being performed.

Furthermore, driving force when setting off can be adjusted. For example, a fast start can be achieved by performing clutch engagement after first increasing the engine rotation speed by depressing the accelerator.

Also, when a wheelie has been performed, the operator can perform quick clutch release and prevent continuation of the wheelie.

In the above preferred embodiments, a configuration has been described in which a gear changing operation by an operator is performed by shift switch 120, but as long as an operator can perform a gear changing operation, gear changing is not limited to this, and provision may also be made for gear changing to be performed by a shift pedal, shift lever, shift handle, or the like. Also, as long as an operator can perform a gear changing operation, as with mode switching switch 110, any kind of configuration may be employed, and a mode switching lever, mode switching pedal, mode switching paddle, mode switching button, or the like, may be used.

Also, in the above preferred embodiments, transmission 100 has been described as operating a plurality of clutches by-wire type clutch lever 200, but this is not a limitation, and a single clutch may also be used.

The present invention is not limited to the above-described preferred embodiments, and various variations and modifications may be possible without departing from the scope of the present invention.

A transmission according to preferred embodiments of the present invention enables an operator to adjust a driving force by manually operating a clutch in a transmission in which the clutch operation is controlled automatically, such as an AT system, AMT system, or the like, improves drivability, and is suitable for use as a transmission in which clutch operation is controlled automatically.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A transmission comprising:
a plurality of clutch actuators arranged to engage or disengage a clutch in a multi-speed transmission;
a shift actuator arranged to perform a shift change of the multi-speed transmission;
a control unit arranged and programmed to control the plurality of clutch actuators and the shift actuator;
a clutch lever; and
a lever operation amount detection section arranged to convert an operation amount of the clutch lever to an electrical signal and to output the electrical signal to the control unit; wherein
the control unit includes at least one of an automated manual transmission mode in which a series of shift change operations are performed by controlling the plurality of clutch actuators and the shift actuator in a coordinated manner when a shift change command is input by a shift operation by an operator, and an automatic transmission mode in which a shift selection and a series of shift change operations are performed automatically without regard to the shift operation by the operator; and
in at least one of the automated manual transmission mode and the automatic transmission mode, the control unit is arranged and programmed to operate a clutch torque capacity of the clutch by determining an operation command value that controls the clutch torque capacity of the clutch based on the operation amount of the clutch lever, and to output the operation command value to the plurality of clutch actuators.

2. The transmission according to claim 1, wherein the control unit is arranged and programmed to limit and determine the operation command value output to the plurality of clutch actuators in at least one of the automated manual transmission mode and the automatic transmission mode based on the operation amount of the clutch lever, and to limit a maximum value of the clutch torque capacity of the clutch.

3. The transmission according to claim 1, wherein
the multi-speed transmission includes a plurality of clutches, and the plurality of clutch actuators are arranged to engage or disengage the plurality of clutches; and
the control unit is arranged and programmed to determine the operation command value to be the operation command value to adjust the clutch torque capacity of the plurality of clutches based on the operation amount of the clutch lever, and to output the operation command value to the plurality of clutch actuators.

4. The transmission according to claim 1, wherein
the multi-speed transmission includes a plurality of clutches, and the plurality of clutch actuators are arranged to engage or disengage the plurality of clutches; and
the control unit is arranged and programmed to determine the operation command value to be an approximate total clutch torque capacity of the plurality of clutches based on the operation amount of the clutch lever, and to output the operation command value to the plurality of clutch actuators.

5. The transmission according to claim 1, wherein
the multi-speed transmission includes a plurality of clutches, and the plurality of clutch actuators are arranged to engage or disengage the plurality of clutches; and
the control unit is arranged and programmed to determine the operation command value by limiting a maximum value of a total clutch torque capacity of the plurality of clutches based on the operation amount of the clutch lever, and to output the operation command value to the plurality of clutch actuators.

6. The transmission according to claim 1, wherein the transmission is an automated manual transmission or a dual clutch automated manual transmission;
the control unit further includes a manual transmission mode in which, in at least one of setting off and stopping, the clutch torque capacity is controlled by deciding the operation command value based on an operation of the clutch lever by the operator, and the control unit is arranged and programmed to output the operation command value to the plurality of clutch actuators; and
a selection section is arranged to switch between and select the manual transmission mode, the automated manual transmission mode, or the automatic transmission mode.

7. The transmission according to claim 1, wherein the control unit is arranged and programmed to constantly enable operation of the clutch torque capacity based on the operation amount of the clutch lever.

8. The transmission according to claim 6, wherein if the lever operation amount detection section fails during selection of the manual transmission mode, the control unit is arranged and programmed to shift from the manual transmission mode to the automated manual transmission mode or the automatic transmission mode.

9. The transmission according to claim 6, wherein the control unit is arranged and programmed to set a threshold value for the operation amount of the clutch lever, to determine the operation command value that is output to the plurality of clutch actuators and the shift actuator using the threshold value, and to execute a predetermined shift change operation.

10. The transmission according to claim 9, wherein, when the manual transmission mode or the automated manual transmission mode has been selected, the predetermined shift change operation is a shift change operation from neutral to a first gear.

11. The transmission according to claim 9, wherein, when the manual transmission mode or the automated manual transmission mode has been selected, the predetermined shift change operation is a shift change operation from a first gear to neutral.

12. The transmission according to claim 9, wherein, when the manual transmission mode or the automated manual transmission mode has been selected, the predetermined shift change operation is a shift change operation from a second gear to a first gear.

13. The transmission according to claim 1, wherein the control unit is arranged and programmed to learn a signal range indicating an operation range of the clutch lever detected by the lever operation amount detection section.

14. The transmission according to claim 1, wherein a rate of increase of operation reaction to the operation amount of the clutch lever changes in at least two stages.

15. A vehicle comprising:
the transmission according to claim 1 mounted therein.
16. A motorcycle comprising:
the transmission according to claim 1 mounted therein.

* * * * *